United States Patent [19]

Ogata et al.

[11] Patent Number: 5,826,049
[45] Date of Patent: Oct. 20, 1998

[54] PARTIAL BROADCAST METHOD IN PARALLEL COMPUTER AND A PARALLEL COMPUTER SUITABLE THEREFOR

[75] Inventors: Yasuhiro Ogata, Akishima; Junji Nakagoshi; Naoki Hamanaka, both of Tokyo; Hiroyuki Chiba, Hachioji; Shinichi Shutoh, Kokubunji; Tatsuo Higuchi, Fuchu; Shigeo Takeuchi, Hanno; Taturu Toba, Kunitachi; Teruo Tanaka, Hachioji, all of Japan

[73] Assignees: Hitachi, Ltd.; Hitachi VLSI Engineering Corporation, both of Tokyo, Japan

[21] Appl. No.: 916,630

[22] Filed: Jul. 22, 1992

[30] Foreign Application Priority Data

Jul. 22, 1991 [JP] Japan .................................. 3-180743

[51] Int. Cl.$^6$ ...................... G06F 15/163; G06F 15/173
[52] U.S. Cl. ..................... 395/311; 395/312; 395/200.68; 395/200.79; 395/800.13
[58] Field of Search ...................... 395/800, 200, 395/311, 312, 200.68, 200.79, 800.13; 364/229, 229.1, 229.2, 229.5, 240, 284, 940, DIG. 1, DIG. 2

[56] References Cited

U.S. PATENT DOCUMENTS

| 4,166,929 | 9/1979 | Sheinbein ................................. 379/267 |
| 4,195,351 | 3/1980 | Barner et al. ............................ 364/900 |
| 4,281,380 | 7/1981 | DeMesa et al. ......................... 395/200 |

(List continued on next page.)

FOREIGN PATENT DOCUMENTS

| 40 19 040 A1 | of 0000 | Germany . | |
| 2545976 | 11/1976 | Germany .......................... H04Q 3/42 |
| 4019040 | 12/1991 | Germany .......................... G06F 15/16 |
| 63-124162 | 5/1988 | Japan . |
| 1-267763 | 10/1989 | Japan ............................... G06F 15/16 |
| 3-209550 | 9/1991 | Japan . |
| 4-61777 | 2/1992 | Japan . |
| 4-273332 | 9/1992 | Japan ............................... G06F 9/445 |
| 5-28122 | 2/1993 | Japan . |

OTHER PUBLICATIONS

*Routing Controller of Cellular Array Processor CAP–II*, by T. Horie, et sal., The Information Processing Society of Japan Research Report, vol. 90, No. 60.
*Broadcast–Network Of Highly Parallel Processor CAP–II*, by S. Kato, et al., The Information Processing Society of Japan Research Report, vol. 90, No. 60.

(List continued on next page.)

*Primary Examiner*—Alyssa H. Bowler
*Assistant Examiner*—John A. Follansbee
*Attorney, Agent, or Firm*—Antonelli, Terry, Stout & Kraus, LLP

[57] ABSTRACT

In order to determine a transfer path of a message to a receiving-end processor group, a processor includes a routing bit generation circuit, and an exchange switch includes partial broadcast path control circuits and a path control information alteration circuit. In order to define the range of a receiving-end processor group, a network includes transfer control circuits. A crossbar switch includes transfer control circuits associated with output ports and a boundary register group. When a partial broadcast message is transferred from an input port in the downstream direction of an output port, it is decided whether a belonging to the partial broadcast range associated with a connected to the particular input port is connected to the particular output port, whereby the particular partial broadcast message is transferred from the same output port.

17 Claims, 27 Drawing Sheets

U.S. PATENT DOCUMENTS

| | | | |
|---|---|---|---|
| 4,398,400 | 8/1983 | Bar | 62/508 |
| 4,412,281 | 10/1983 | Works | 364/200 |
| 4,527,237 | 7/1985 | Frieder et al. | 364/200 |
| 4,623,996 | 11/1986 | McMillen | 370/418 |
| 4,630,258 | 12/1986 | McMillen et al. | 370/411 |
| 4,663,706 | 5/1987 | Allen et al. | 395/200 |
| 4,667,191 | 5/1987 | Comroe et al. | 340/825.5 |
| 4,667,287 | 5/1987 | Allen et al. | 395/800 |
| 4,679,189 | 7/1987 | Olson et al. | 370/60 |
| 4,709,327 | 11/1987 | Hillis et al. | 364/200 |
| 4,747,130 | 5/1988 | Hu | 379/269 |
| 4,757,442 | 7/1988 | Sakata | 364/19.1 |
| 4,811,210 | 3/1989 | McAulay | 395/312 |
| 4,891,787 | 1/1990 | Giffard | 395/381 |
| 4,955,016 | 9/1990 | Eng et al. | 370/60 |
| 4,985,830 | 1/1991 | Atac et al. | 364/200 |
| 5,001,702 | 3/1991 | Teraspinna et al. | 370/392 |
| 5,001,706 | 3/1991 | Dighe et al. | 370/422 |
| 5,036,518 | 7/1991 | Tseung | 371/32 |
| 5,065,308 | 11/1991 | Evans | 395/800 |
| 5,079,767 | 1/1992 | Perlman | 370/94.3 |
| 5,091,905 | 2/1992 | Amada | 370/415 |
| 5,115,499 | 5/1992 | Stiffler | 395/425 |
| 5,126,999 | 6/1992 | Munter et al. | 370/60 |
| 5,129,077 | 7/1992 | Hillis | 395/500 |
| 5,130,975 | 7/1992 | Akata | 370/416 |
| 5,138,611 | 8/1992 | Carn et al. | 370/60 |
| 5,166,674 | 11/1992 | Baum et al. | 340/825.07 |
| 5,179,552 | 1/1993 | Chao | 370/60 |
| 5,181,017 | 1/1993 | Frey, Jr. et al. | 340/825.02 |
| 5,222,085 | 6/1993 | Newman | 370/422 |
| 5,226,125 | 7/1993 | Balmer et al. | 395/325 |
| 5,239,654 | 8/1993 | Ing-Simmons et al. | 395/800 |
| 5,251,299 | 10/1993 | Masuda et al. | 395/200 |
| 5,271,014 | 12/1993 | Bruck et al. | 371/11.1 |
| 5,280,474 | 1/1994 | Nickolls et al. | 370/60 |
| 5,280,627 | 1/1994 | Flaherty et al. | 395/652 |
| 5,301,273 | 4/1994 | Konishi | 395/200 |
| 5,301,322 | 4/1994 | Hamanaka et al. | 395/650 |
| 5,305,462 | 4/1994 | Grondalski | 395/800 |
| 5,313,408 | 5/1994 | Goto | 364/514 |
| 5,317,735 | 5/1994 | Schomberg | 395/650 |
| 5,321,813 | 6/1994 | McMillen et al. | 395/200 |
| 5,325,529 | 6/1994 | Brown et al. | 395/200.09 |
| 5,339,396 | 8/1994 | Muramatsu et al. | 395/325 |
| 5,377,333 | 12/1994 | Nakagoshi et al. | 395/325 |
| 5,388,242 | 2/1995 | Jewett | 395/425 |
| 5,404,461 | 4/1995 | Olnowich et al. | 395/311 |
| 5,418,955 | 5/1995 | Ikeda et al. | 395/651 |
| 5,426,775 | 6/1995 | Boccoon-Gibod | 395/183.12 |
| 5,448,716 | 9/1995 | Hardell, Jr. et al. | 395/550 |
| 5,450,576 | 9/1995 | Kennedy | 395/650 |
| 5,465,360 | 11/1995 | Miller et al. | 395/700 |
| 5,491,788 | 2/1996 | Cepulis et al. | 395/182.11 |
| 5,497,497 | 3/1996 | Miller et al. | 395/800 |

OTHER PUBLICATIONS

IEEE Journal on Selected Areas in Communications, "Practical Implementation and Packaging Technologies for a Large–Scale ATM Switching System", A. Itoh, et al., vol. 9, No. 8, pp. 1280–1288, Oct. 1991.

IEEE Journal on Selected Areas in Communications, "A Reconfigurable ATM Switch for Fault Tolerance and Traffic Balancing", Shih–Chian Yang, et al., vol. 9, No. 8, pp. 1205–1217, Oct. 1991.

Yang et al, "A Reconfigurable ATM Switch Fabric for Fault Tolerance and Traffic Balancing", IEEE, 1991, pp. 1205–1216.

Siegel et al., "Using the Multistage . . . Parallel Supercomputers," IEEE, 1989, pp. 1932–1953.

FIG. 8

| TRANS-MISSION PE NO. | RECEIVING PE NO. | CTL BIT | | | DATA |
|---|---|---|---|---|---|
| | | RO | RI | PBC | |

(a) shows all fields populated.

(b) TRANS-MISSION PE NO.: *, RECEIVING PE NO.: *, RO, RI: 1, 0
(c) *, *, *, *, 1, 0
(d) TRANS-MISSION PE NO., RECEIVING PE NO., *, *, 0, 0

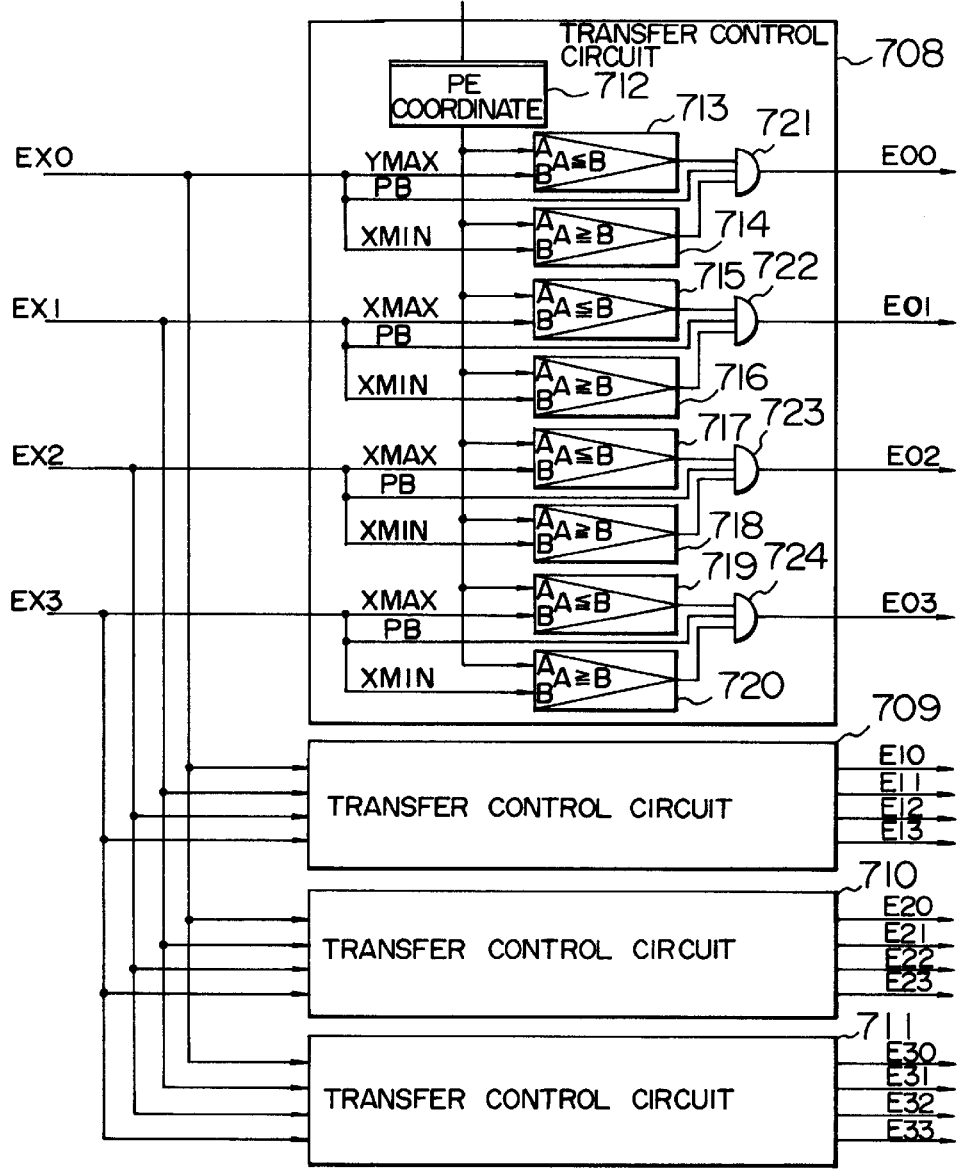

| TRANSMIS-SION PE NO. | RECEIVING PE NO. | CTL BIT | | DATA |
|---|---|---|---|---|
| | | PB | BC | |

FIG. 20

| PARTIAL BROADCAST RANGE | | | RO | RI | REMARK |
|---|---|---|---|---|---|
| ARRANGEMENT | NUMBER OF ROWS | NUMBER OF COLUMNS | | | |
| TWO DIMENSIONAL | PLURAL | PLURAL | 1 | 1 | TRANSFER REQUIRED TO XB-X, XB-Y |
| ONE ROW | PLURAL | 1 | 1 | 0 | TRANSFER REQUIRED ONLY TO XB-X |
| ONE COLUMN | 1 | PLURAL | 0 | 1 | TRANSFER REQUIRED ONLY TO XB-Y |
| ONE UNIT | 1 | 1 | 0 | 0 | TRANSFER REQUIRED ONLY TO SENDING SOURCE PE |

FIG. 21

| CASE NO. | MESSAGE INPUT | | OPERATION OF PARTIAL BROADCAST PATH CONTROL CIRCUIT | OUTPUT MESSAGE | |
|---|---|---|---|---|---|
| | RO | RI | | RO | RI |
| 1 | 1 | 1 | MESSAGE SENT OUT TO XB-X | 0 | 1 |
| 2 | 1 | 0 | MESSAGE SENT OUT TO XB-X | 0 | 0 |
| 3 | 0 | 1 | MESSAGE SENT OUT TO XB-Y | 0 | 0 |
| 4 | 0 | 0 | MESSAGE SENT OUT TO PE | 0 | 0 |

FIG. 29A

| INPUT INFORMATION | | | OUTPUT INFORMATION |
|---|---|---|---|
| BC | XADR=X-PORT NO.? | YADR=Y-PORT NO.? | OUTPUT PORT ID |
| NO | NO | NO | PORT X |
| NO | NO | YES | PORT X |
| NO | YES | NO | PORT Y |
| NO | YES | YES | PORT PE |
| YES | YES/NO | YES/NO | PORT X |

FIG. 29B

| INPUT INFORMATION | | | OUTPUT INFORMATION |
|---|---|---|---|
| BC | XADR=X-PORT NO.? | YADR=Y-PORT NO.? | OUTPUT PORT ID |
| NO | YES/NO | NO | PORT Y |
| NO | YES/NO | YES | PORT PE |
| YES | YES/NO | YES/NO | PORT Y |

FIG. 29C

| INPUT INFORMATION | | | OUTPUT INFORMATION |
|---|---|---|---|
| BC | XADR=Y-PORT NO.? | YADR=Y-PORT NO.? | OUTPUT PORT ID |
| YES/NO | YES/NO | YES/NO | PORT PE |

FIG. 33

| PORT NO. | MODE | | | |
|---|---|---|---|---|
| | 00 | 01 | 10 | 11 |
| 0 ~ n/8-1 | 0 ~ n-1 | 0 ~ n/2-1 | 0 ~ n/4-1 | 0 ~ n/8-1 |
| n/8 ~ 2n/8-1 | 0 ~ n-1 | 0 ~ n/2-1 | 0 ~ n/4-1 | n/8 ~ 2n/8-1 |
| 2n/8 ~ 3n/8-1 | 0 ~ n-1 | 0 ~ n/2-1 | n/4 ~ 2n/4-1 | 2n/8 ~ 3n/8-1 |
| 3n/8 ~ 4n/8-1 | 0 ~ n-1 | 0 ~ n/2-1 | n/4 ~ 2n/4-1 | 3n/8 ~ 4n/8-1 |
| 4n/8 ~ 5n/8-1 | 0 ~ n-1 | n/2 ~ n-1 | 2n/4 ~ 3n/4-1 | 4n/8 ~ 5n/8-1 |
| 5n/8 ~ 6n/8-1 | 0 ~ n-1 | n/2 ~ n-1 | 2n/4 ~ 3n/4-1 | 5n/8 ~ 6n/8-1 |
| 6n/8 ~ 7n/8-1 | 0 ~ n-1 | n/2 ~ n-1 | 3n/4 ~ n-1 | 6n/8 ~ 7n/8-1 |
| 7n/8 ~ n-1 | 0 ~ n-1 | n/2 ~ n-1 | 4n/4 ~ n-1 | 7n/8 ~ n-1 |

PARTIAL BROADCAST METHOD IN PARALLEL COMPUTER AND A PARALLEL COMPUTER SUITABLE THEREFOR

BACKGROUND OF THE INVENTION

The present invention relates to a broadcast function for transferring a data from a specific processor to a multiplicity of processors in a parallel computer for executing computations at high speed with a plurality of processors.

Parallel computers are becoming commercially available in which a multiplicity of processors are coupled by a network and are operated at high speed while being coordinated with each other.

A method for realizing a broadcast function in a parallel computer having a cube network which can transfer data from one processor to another at high speed due to a short transfer path is disclosed, for example, in JP-A-1-267763.

According to the method disclosed in JP-A-1-267763, a number n of processors are solved into factors $n_1 \times n_2 \times n_3 \times \ldots \times n_n$, and the processors are arranged on an n-dimensional grid space with each of the factors as the number of grid points on a side. Each side is interconnected by a partial network to constitute a message transfer path, thus realizing a broadcast function for transferring a data parallelly from one processor to all the processors.

The data transfer functions between processors of a parallel computer include, in addition to the broadcast function, a partial broadcast function in which a data is transferred only to processors of a processor group within a limited range. The partial broadcast function is required for a parallel computer in parallel execution of a program while being mapped in a part of the processors.

A parallel computer having a torus network equipped with a partial broadcast function includes a system described, for example, in The Information Processing Society of Japan Research Report Vol. 90, No. 60, pp. 223–228. This system comprises a plurality of processors arranged on a two-dimensional grid and are interconnected in two-dimensional torus. The range of the receiving processors is limited to the vicinity of the sending processors (along the directions of row, column, and combinations row and column) to realize the partial broadcast, although no specific method of partial broadcasting is disclosed.

JP-A-61-35645, on the other hand, discloses a technique of attaching a processor-group identifier to a message from one of a plurality of processors connected with a common bus so that only the processors associated with the identifier may receive the particular message. A similar technique is also disclosed in The Information Processing Society of Japan Research Report, Vol. 90, No. 60, pp. 229–234.

A technique for attaching an identification number to a message and transferring a data selectively to a part of processors in dependence on the particular identification number is described in JP-A-1-251266. The network in the cited example is a grid-structured network. Each processor has a link table therein for storing information to control the requirement as to whether the message received should be transferred to which output port of the particular processor in dependency on the ID number of the message. Each processor transfers a received message to a specific output port in dependency on the link table and the message ID number in the message. As a result, it follows that messages transmitted from given processors are transferred to a plurality of specific processors through different processors.

Also, JP-A-2-91755 deals with another technique for transferring a message selectively to a part of processors in dependency on an ID number attached to the message. Such a technique has a network with a plurality of switches interconnected. Each switch has a switch table for storing information to control the requirement as to whether a message inputted to the switch is transferred to which output port of the switch in dependency on the ID number of the message. Each switch transfers the message selectively to a specific output port of the switch in dependency on the switch table and the message ID number in the message. As a result, messages transmitted from given processors are transferred to a plurality of specific processors through different switches.

The system disclosed in JP-A-61-35645, in which a broadcast message is sent to all processors and is handled in all the processors, develops a wasteful message transfer.

According to the system described in The Information Processing Society of Japan Research Report Vol. 90, No. 60, pp. 223–228, on the other hand, in which no message is transferred to a path leading to processors other than those requiring partial broadcast but the grid-structured network thereof necessitates sequential data transfer, takes a long time in data transfer in the case where a wide range of processors requiring partial broadcast is involved.

From the viewpoint of high-speed data transfer, it is desirable to broadcast data in parallel to a plurality of processors as indicated by JP-A-1-267763. In the case of a data transfer in a parallel transfer network, however, a data may undesirably be transferred to a processor to which no data transfer is required. This wasteful data transfer adds to the network load and hampers program execution, resulting in a deteriorated performance.

The technique of JP-A-1-251266 uses a grid-structured network, and therefore a message to be partially broadcast is sequentially transferred to a plurality of specific processors through different processors. This is not desirable from the viewpoint of transfer speed. This well-known system contains no technique for transferring messages to be broadcast in parallel.

According to JP-A-2-91755, by contrast, in spite of a network configuration with a plurality of switches interconnected and capable of transferring a message requiring partial broadcast to a specific part of processors, the operation described therein is confined to inputting a single message requiring partial broadcast to a single switch. Especially, no description is made about the technique by which a plurality of messages requiring partial broadcast inputted in parallel from different input ports of a switch are transferred in parallel within the same switch.

SUMMARY OF THE INVENTION

The object of the present invention is to provide a method and apparatus of partial broadcast in a parallel computer in which a plurality of partial broadcast messages can be transferred in parallel by use of a network capable of broadcasting a data to a plurality of processors in parallel, while minimizing the wasteful transfer to paths requiring no transfer.

In order to achieve the above-mentioned object, according to the present invention, the transfer control information determined by the addresses of processors requiring partial broadcast are stored in a network in advance, so that in the case where a partial broadcast message reaches a plurality of points (transfer control points) in a network, whether the message is to be transferred downstream is controlled in accordance with the particular transfer control information.

According to a preferable mode of the present invention, when a network is made up of a plurality of partial networks, the above-mentioned transfer control information is stored in each of the partial networks. According to a more preferable mode of the invention, the transfer control information including information as to whether a partial broadcast message should be transferred downstream or not of each transfer control point is stored.

According to still another mode of the invention, a broadcast message including the transfer control information for controlling the transfer destination of the message is broadcast, and when the message reaches any of a plurality of predetermined points (transfer control points) in a network, whether the message is to be transferred further downstream is controlled in accordance with the transfer control information contained in the message. According to a specific example of the present invention, each of a plurality of partial networks making up a full network comprises means for storing the transfer control information representing the address range (maximum and minimum addresses) associated with the system address of a processor requiring partial broadcast, means for determining whether a processor associated with an address range is connected on the downstream side of an output port in the partial network on the basis of the particular address range when a partial broadcast message has reached the output port, and means for controlling the downstream transfer of the message in accordance with the result of determination.

Further, according to an even more preferable mode of the present invention, a plurality of processor groups are defined, and a message is broadcast within each of the processor groups.

For this purpose, more specifically, a plurality of transfer control information determined by each processor group are stored in advance at each transfer control point, and when a broadcast message has reached a transfer control point, whether or not a processor associated with any of the processor groups is connected downstream of the transfer control point is determined in accordance with the transfer control information. The result of this determination is used for controlling as to whether or not the particular broadcast message should be transferred downstream.

BRIEF DESCRIPTION OF THE DRAWINGS

FIG. 8 is a diagram showing the format of a message used in the first embodiment.

FIG. 11 is a diagram showing the configuration of a partial broadcast path control circuit shown in FIG. 9.

FIG. 12 is a diagram showing the format of a message used in the second embodiment.

FIG. 20 is a diagram showing the relationship between the the shape of partial broadcast range and the routing bits R0, R1 generated at the transmission destination (PE).

FIG. 21 is a diagram showing the relationship between the operation of an exchange switch (EX) and the routing bits R0, R1.

FIG. 29A is a diagram for explaining the operation of a demand address generation circuit in a PE input port of the exchange switch shown in FIG. 28.

FIG. 29B is a diagram for explaining the operation of a demand address generation circuit in an x input port of the exchange switch shown in FIG. 28.

FIG. 29C is a diagram for explaining the operation of a demand address generation circuit in a Y input port of the exchange switch shown in FIG. 28.

FIG. 33 is a diagram showing the relationship between the range of output ports requiring transfer of a broadcast message in the crossbar switch shown in FIG. 31 and mode information.

DESCRIPTION OF THE PREFERRED EMBODIMENTS

A first embodiment of the invention will be explained with reference to the drawings.

Figure 1:
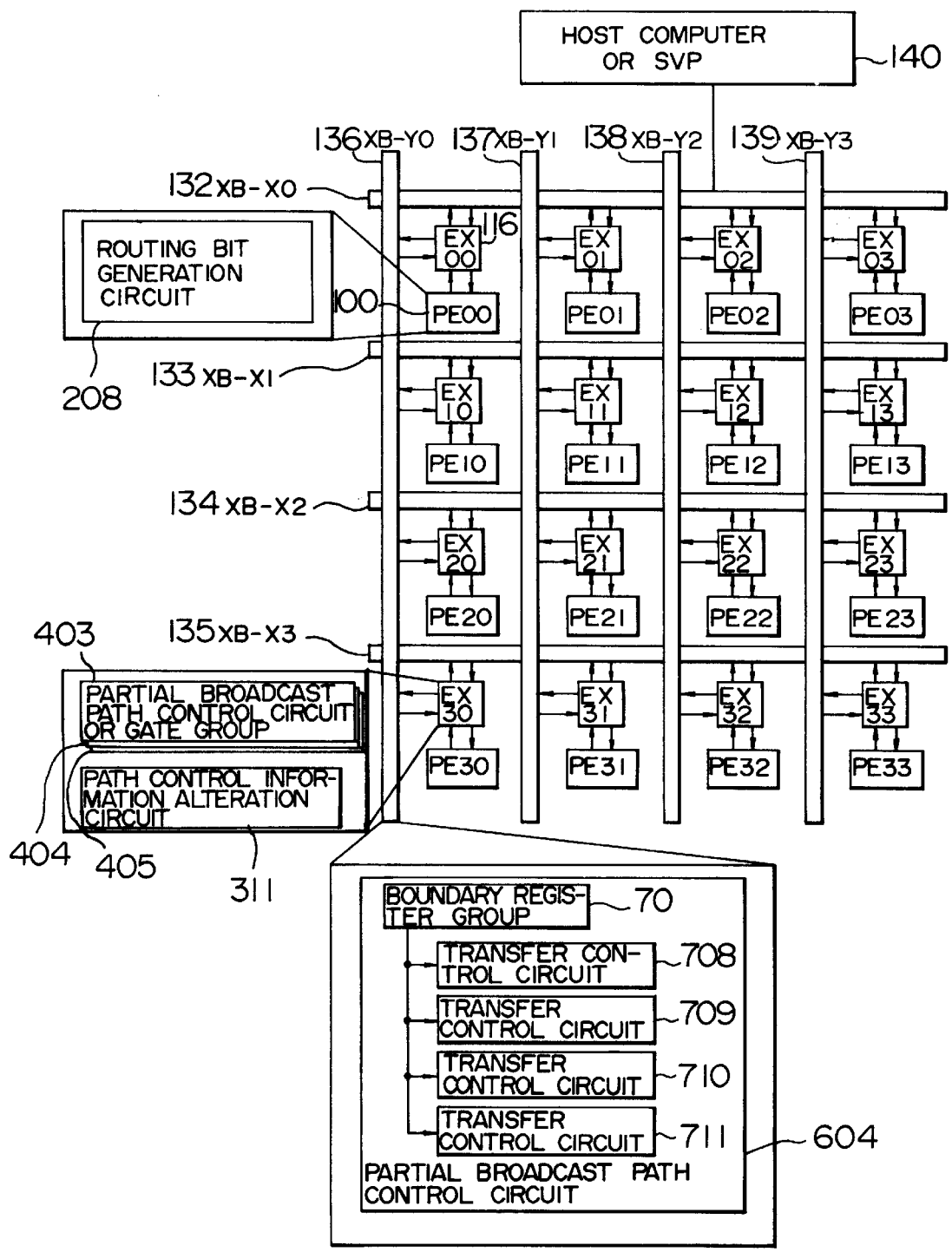
FIG. 1 is a diagram showing the configuration of a parallel computer according to a first embodiment of the present invention.

In FIG. 1, reference numeral 100 designates a processor (hereinafter referred to as "PE"), numerals 132 to 135 X-crossbar switches (hereinafter referred to as "XB-X"), numerals 136 to 139 Y-crossbar switches (hereinafter referred to as "XB-Y"), and numeral 116 an exchange switch (hereinafter referred to as "EX") arranged at the intersections of XB-X and XB-Y. In the description that follows, these crossbar switches may alternatively be referred to simply as an XB if not used indiscriminately. Numeral 140 designates a host computer or a service processor (SVP). Each PE is given a PE number as X and Y coordinates of a grid point of a two-dimensional coordinate space. Each XB-X is provided for the PE having the same Y coordinate, and is called as XB-Xi with the Y coordinate i thereof. Each XB-Y, which is arranged for a PE having the same X coordinate, is called as XB-Yj with the X coordinate j attached thereto. Each EX arranged for a corresponding PE will be affixed with the same number as the corresponding PE number. In the shown case, four crossbar switches each along X direction and Y direction are arranged as an example.

According to this embodiment, each PE has a routing bit generation circuit 208 for generating the path control information to transmit a partial broadcast message containing the path control information.

Each EX is for transferring the partial broadcast message from the PE, XB-X or XB-Y further to the XB-Y, XB-X or PE, and has partial broadcast path control circuits 403 to 405 for determining the destination of message transfer in accordance with the path information contained in the transferred partial broadcast message. Further, the EX includes a circuit 311 for modifying the path control information in the message before transferring the partial broadcast message.

Each XB, on the other hand, is for transferring the partial broadcast message inputted thereto from a given input port to a plurality of output ports in parallel and includes a partial broadcast path control circuit 604. The circuit 604 includes a boundary register group 70 for holding the information on a plurality of processors and transfer control circuits 708 to 711 for determining whether there is a processor associated with a processor group downstream of an output port from the contents of the particular register group and also whether or not the particular message should be transferred downstream of the output port when a partial broadcast message is transferred to each output port. If there is any such processor, the message is transferred to the EX present downstream of the particular output port. FIG. 19 is a diagram showing an example of processor groups. Each processor group 50A to 50K is comprised of PE's among which a partial broadcast message is transferred. Each circle shows PE and each number in each circle indicates a PE number. Each processor group, as shown in FIG. 19A, may include a PE in a two-dimensional region 50A, 50B or 50C, or as an alternative, a row or column of PEs as shown in FIG. 19B or C.

The feature of this embodiment lies in that when a message is partially broadcast in a processor group, another message can be broadcast in parallel in other processor groups.

Figure 19A:
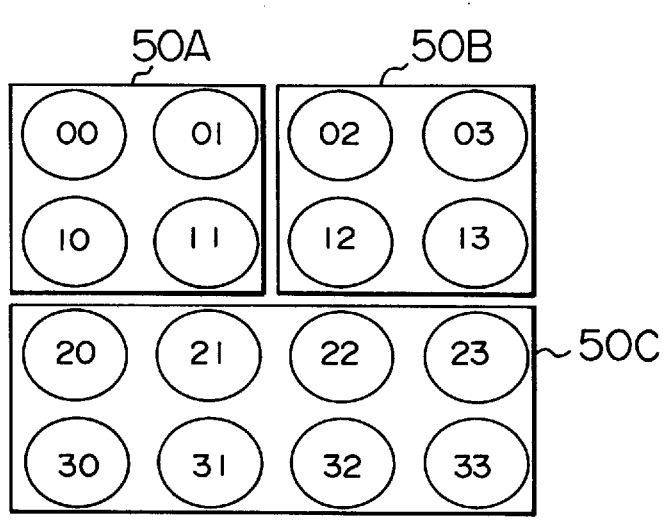
FIG. 19A is a diagram a plurality of combinations of partial broadcast ranges.
Figure 19B:
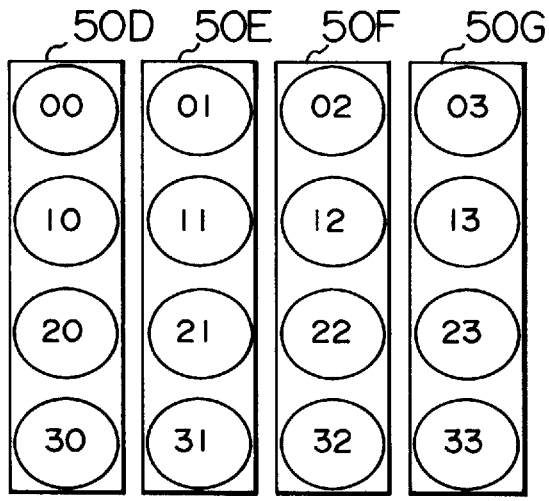
FIG. 19B is a diagram showing a plurality of different combinations of partial broadcast ranges.

In the explanation that follows, a case of FIG. 19A will be referred to unless otherwise specified.

According to this embodiment, it is possible to transfer a message (normal message) to a specified PE, another message (broadcast message) to all the PEs, and still another message (partial broadcast message) to a part of the PEs.

First, a message format is shown in FIG. 8. Every message, as. shown in FIG. 8A, is comprised of fields holding a transmission PE number, a receiving PE number, path control information (having two routing bits (R0, R1)), a CTL (control) bit and a data respectively. The CTL bit represents an attribute of a message and has therein a PB bit indicating a partial broadcast mode and a BC bit indicating a full broadcast mode. The transmission PE number is the number of the PE for sending out a message. The receiving PE number is the number of the PE receiving a message. Of all the routing bits, R0 is a bit indicating whether the transmission to XB-X is required, and R1 is a bit indicating whether the transmission to XB-Y is necessary. In the case of partial broadcast according to the present invention, as shown in FIG. 8B, PB=1 and BC=0 with R0 and R1 having a proper value while the transmission PE number and the receiving PE number have no significant value. The asterisk * shows this state.

In the case of full broadcast, by contrast, as shown in FIG. 8C, PB=0 and BC=1. In spite of this, R0, R1, the transmission PE number or the receiving PE number assumes no significant value.

For a normal message, on the other hand, as shown in FIG. 8D, both the transmission PE number and the receiving PE number are significant but PB=BC=0, with R0 and R1 assuming no significant value. The method of generating and using the bits R0, R1, PB and BC will be described later herein.

Figure 2:
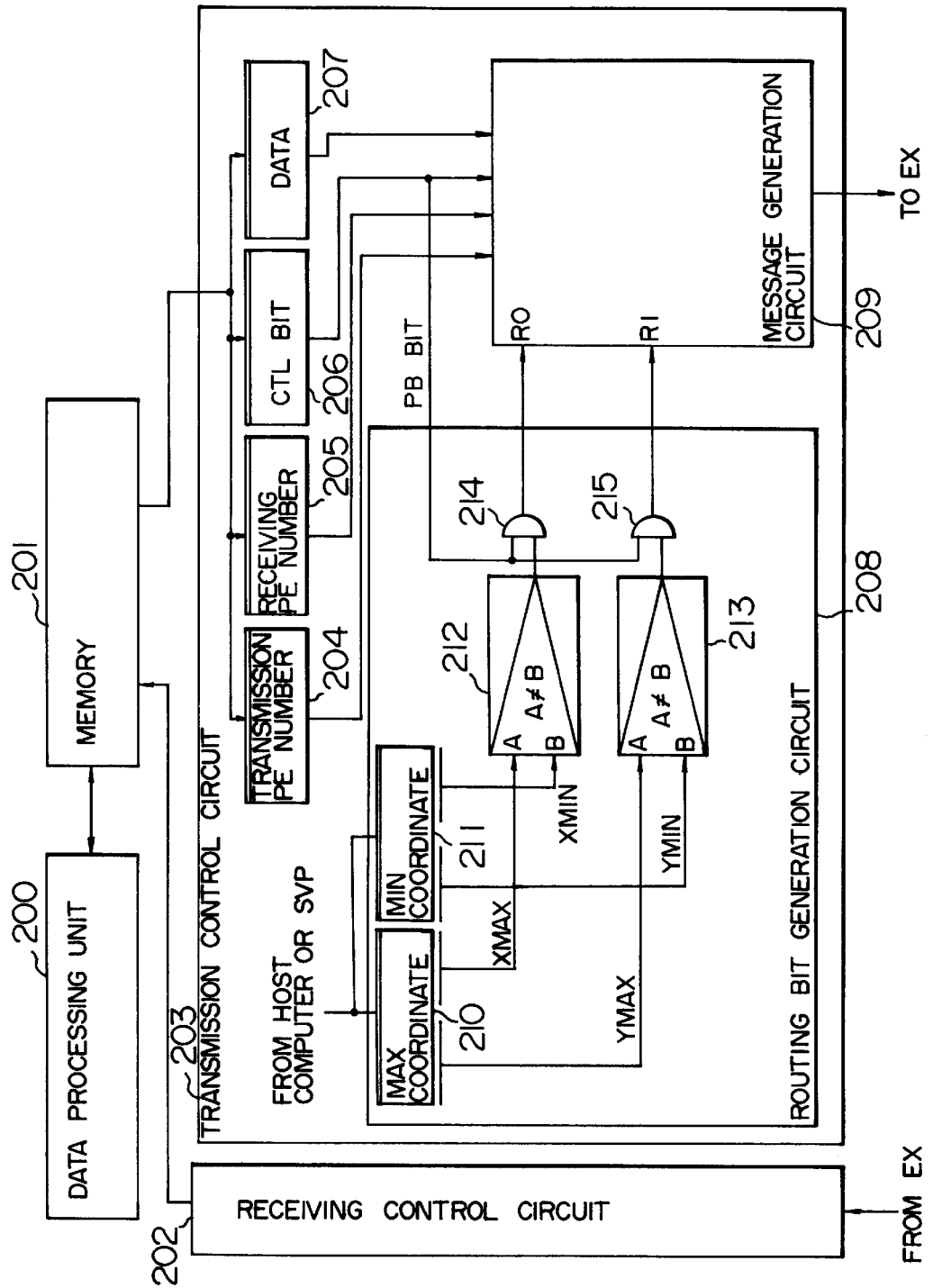
FIG. 2 is a diagram showing the configuration of a processor element (PE) shown in FIG. 1.

The configuration of each PE is shown in FIG. 2. Numeral 200 designates a data processing unit for executing a program, numeral 201 a memory for storing data and a series of instructions, numeral 202 a receiving control circuit for receiving a message from an EX corresponding to the PE involved and transferring it to the memory 201, and numeral 203 a transmission control circuit. The transmission control circuit 203 includes registers 204 to 207 for holding messages other than the routing bits R0, R1 read out of the memory 201, a routing bit generation circuit 208 for generating the routing bits R0, R1 newly attached to the message, and a message generation circuit 209 for generating a message and transferring it to an EX corresponding to the PE. The messages held in the registers 204 to 207 are comprised of fields of a transmission PE number, a receiving PE number, a CTL bit and a data. A part of these fields, as shown in FIGS. 8B to D, is not significant depending on the type of message sent out. Especially, only the CTL bit and the data are significant among the partial broadcast messages.

The routing bit generation circuit 208 is adapted to operate at the time of transmitting a partial broadcast message from the PE involved. This circuit 208 includes registers 210, 211 for holding the maximum coordinates (the maximum Y coordinate YMAX and the maximum X coordinate XMAX) and the minimum coordinates (the minimum Y coordinate YMIN and the minimum X coordinate XMIN) in the PE coordinate of a processor group requiring partial broadcast from the PE involved, a comparator circuit 212 for comparing the maximum X coordinate XMAX with the minimum X coordinate XMIN, a comparator circuit 213 for comparing the maximum Y coordinate YMAX with the minimum Y coordinate YMIN, AND circuits 214, 215 for generating a logical product of each of the respective results and the partial broadcast bit (PB bit). In the case of FIG. 19A, for example, the register 210 in PE00, PE01, PE10 and PE11 holds the coordinate 11 of PE11, and the register 211 the coordinate 00 of PE00. These values are set from an external unit (such as a host computer or SVP 140 (FIG. 1)) beforehand (such as at the time of loading a program in PE).

Figure 19C:
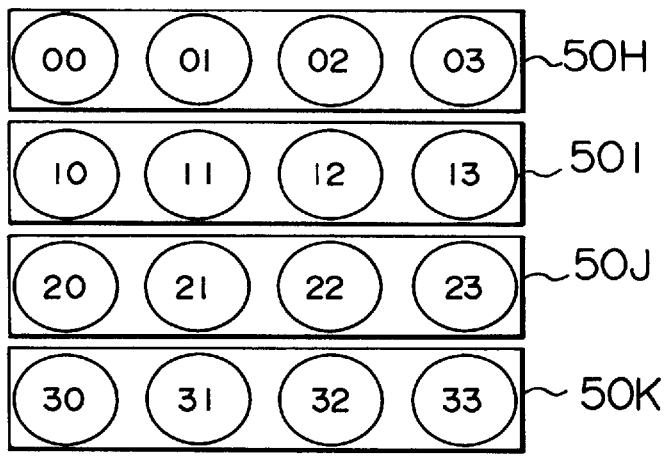
FIG. 19C is a diagram showing a plurality of another different combinations of partial broadcast ranges.

In the processor PE (such as PE00 in the case of the processor group 50A shown in FIG. 19A) for transmitting a partial broadcast message, the required information is read by the data processing unit 200 from the memory 201 and, after being set in the registers 204 to 207, is sent to the message generation circuit 209. In the case of partial broadcast, a binary 1 is set as a PB bit and a binary 0 as a BC bit in the CTL bit 206. The XMAX in the MAX coordinate 210 is compared with the XMIN in the MIN coordinate 211 by the comparator circuit 212, and the YMAX in the MAX coordinate 210 with the YMIN in the MIN coordinate 211 by the comparator circuit 213. These comparator circuits are adapted for producing a binary 1 when there is no coincidence as a result of comparison. The outputs of these comparator circuits 212, 213 are applied to the AND circuits 214, 215 for producing a logical product with a PB bit in the CTL bit and the product thus obtained is applied to the message generation circuit 209. The bit R0 is for indicating whether a signal is to be sent from the PE to the XB-X, and the bit R1 whether a signal is to be sent to the XB-Y. More specifically, the relationship between the shape of the processor group and the values of R0, R1 generated i the PE is as shown in FIG. 20. In other words, when XMAX coincides with XMIN, namely, when the processor group requiring partial broadcast belongs to a single column (as shown in FIG. 19B), R0 becomes zero, thus preventing a broadcast message from being transmitted to XB-X0. In similar fashion, when the processor group requiring partial broadcast is included in a single row (as shown in FIG. 19C), R1 becomes zero, thereby preventing a broadcast message from being sent out to XB-Y0. In the case of FIG. 19A, both R0 and R1 are "1". More specifically, this indicates that there is a needed of transmitting a broadcast message in the direction of XB-X or XB-Y from the PE involved. The message generation circuit 209 generates a message and sends it out to EX in the form shown in FIG. 8B, C or D by adding R0, R1 to the information sent from the circuits 204 to 208.

Figure 3:
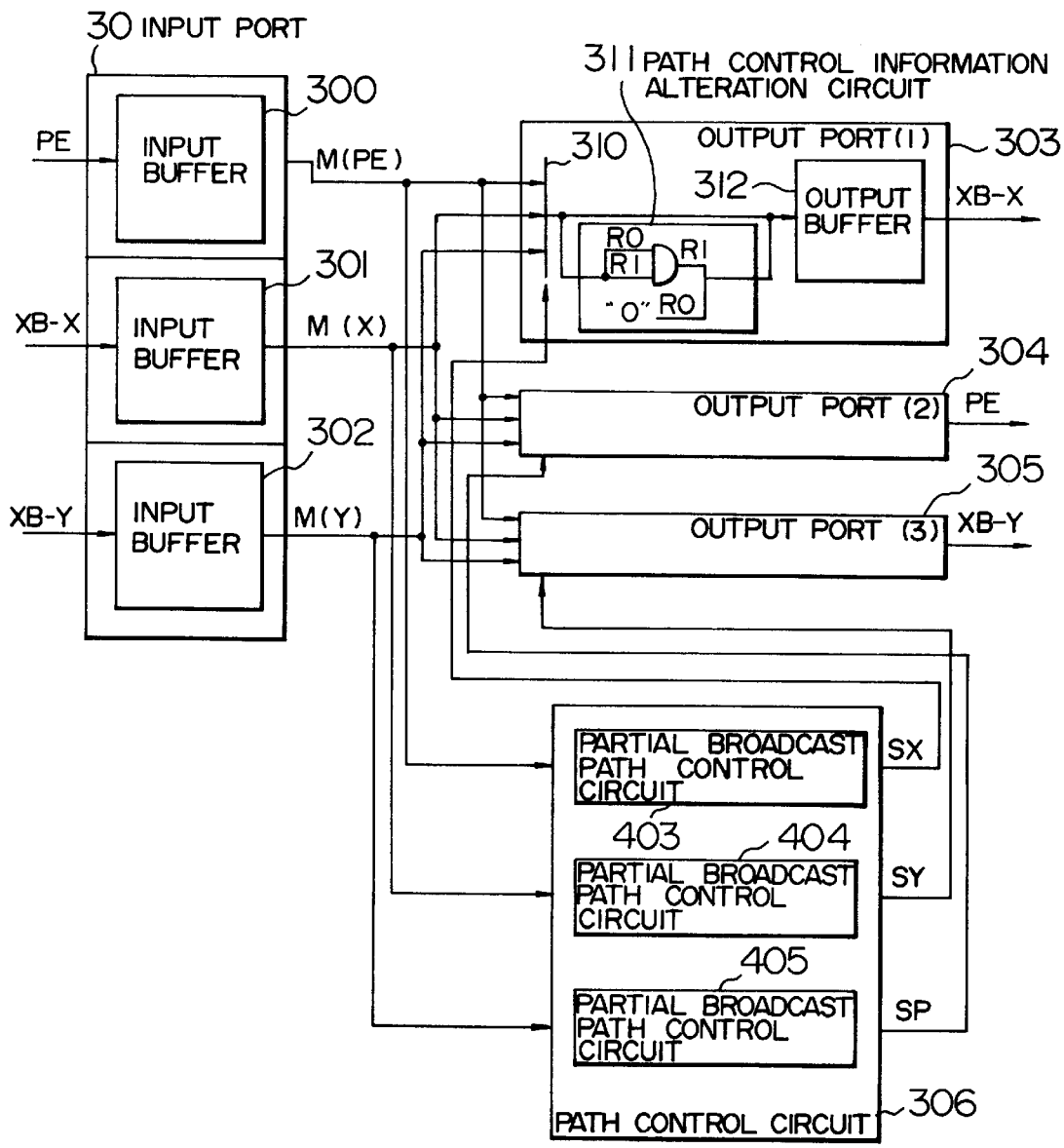
FIG. 3 is a diagram showing the configuration of an exchange switch (EX).

FIG. 3 shows a configuration of each EX. Every EX has the same hardware construction. Three input ports 30 of each EX are connected to the PE, XB-X and XB-Y respectively. The messages inputted to the input ports 30 are held temporarily in input buffers 300 to 302 respectively. Numerals 303 to 305 designate output ports for sending a message to XB-X, PE and XB-Y respectively, numeral 306 a path control circuit for determining the transmission destination of the messages in the input buffers 300 to 302. The feature of the present invention resides in that the circuit 306, as will be described later, has a partial broadcast path control circuit 403, 404 or 405 associated with each input port. These circuits determine the transfer destination of a partial broadcast message inputted thereto in accordance with the routing bit contained therein.

Numeral 310 designates a selector for selecting a message to be transmitted in response to a signal from the path control circuit 306. Numeral 312 designates an output buffer for holding a selected message temporarily. Numeral 311 designates a path control information alteration circuit for changing the routing bit R1. The output ports 304 and 305 are configured in a manner similar to 303.

Figure 4:
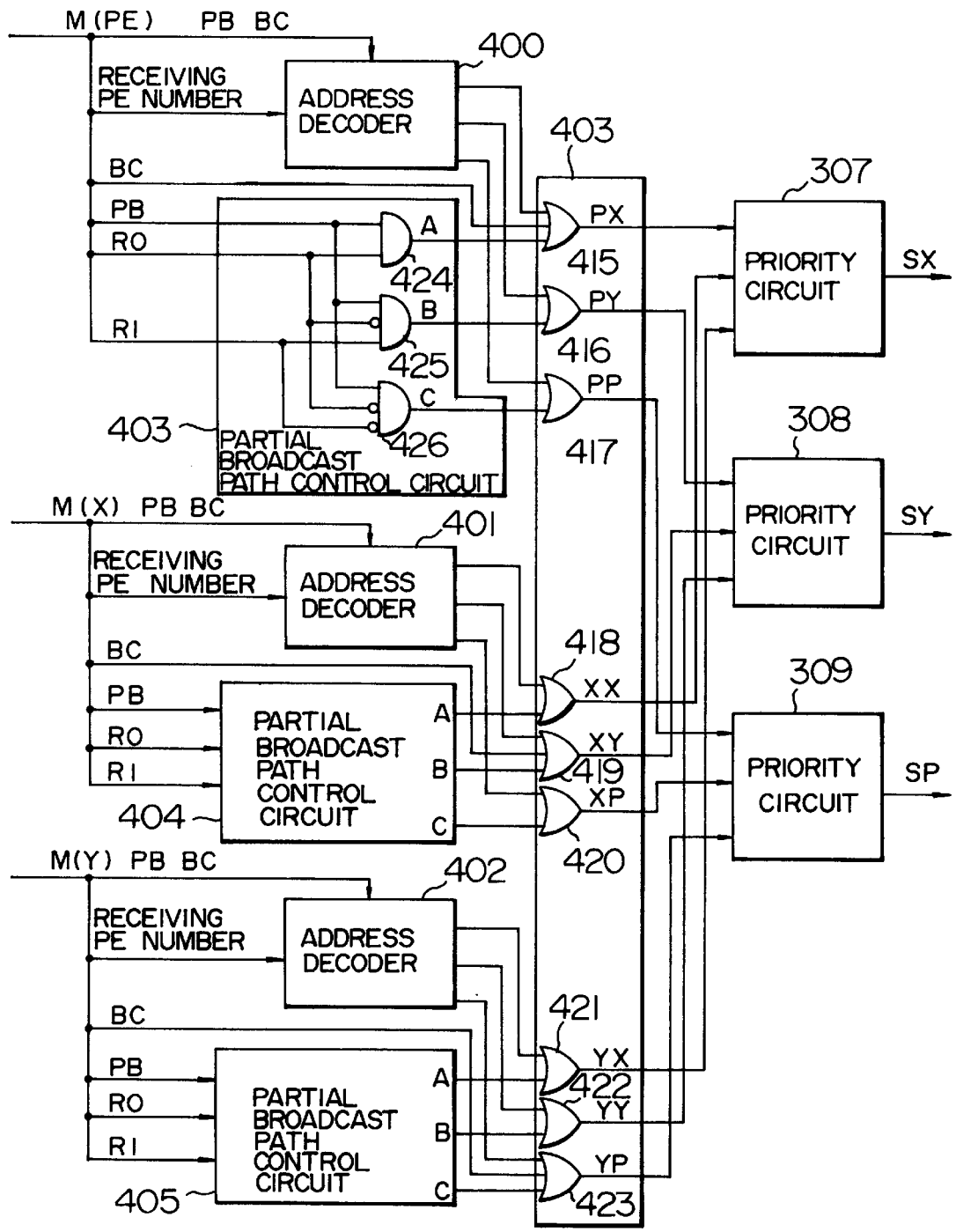
FIG. 4 is a diagram showing the configuration of a path control circuit.

FIG. 4 shows an internal configuration of the path control circuit 306. Numerals 403 to 405 designate partial broadcast path control circuits for determining a path in accordance with the routing bit in partial broadcast. Numerals 400 to 402 designate address decoders for determining a transmission designation of a message M(PE), M(x) or M(Y), if normal, applied to the input buffers 300 to 302 respectively, by decoding the receiving PE number therein. These decoders are activated when PB and BC in the message are zero. The signals M(PE), M(x) and M(Y) represent message signals (the receiving PE number, the routing bits R0, R1, the partial broadcast bit PB and the broadcast bit BC) inputted from the PE, XB-X and XB-Y connected with the EX involved. Output signals PX, XX and YX, on the other hand, represent signals indicating the transmission of the messages inputted from PE, XB-X and XB-Y respectively to XB-X. In similar manner, output signals PY, XY and YY indicate the transmission of messages inputted from PE, XB-X and XB-Y respectively to X-Y, and output signals PP, XP, YP the transmission of the messages inputted from PE, XB-X and XB-Y respectively to the PE.

The path control circuits 403 to 405 are newly inserted in the present embodiment for determining the transmission destination of a partial broadcast message in accordance with FIG. 21 by a routing bit in the message. In the case of a partial broadcast message inputted from the PE, for instance, the path control circuit 403 operates such that the output A of the AND circuit 424 is "1" and the PX "1" when PB is "1" and R0 is "1" (in the case 1 or 2 in FIG. 21), and therefore XB-X becomes the transmission destination. When PB is a binary 1 and R0 a binary 0 with R1 a binary 1 (in the case 3 in FIG. 21), on the other hand, the output B of the AND circuit 425 is a binary 1 and PY a binary 1, so that XB-Y is the transmission destination. In the case where PB is a binary 1 and R0 a binary 0 with R1 a binary 0 (in the case 4 in FIG. 21), by contrast, the output C of the AND circuit 426 becomes a binary 1 with PP a binary 1, thus making PE the transmission destination. The other partial broadcast path control circuits 404 and 405 have also exactly the same construction and operation as the circuit 403.

As seen above, the reason why the transfer destination of a partial broadcast message is determined by R0 and R1 is that as will be understood from the description of the operation below, a transfer destination can be easily determined when the same partial broadcast message passes the same EX a plurality of times. For this purpose, it is necessary to change R0, R1 by the path control information alteration circuit 311 (FIG. 3) after determining the transfer destination of the partial broadcast message. In this circuit, as shown in the column to the extreme right in FIG. 21, R1 is held at "1" only when both the routing bits R0 and R1 of the message selected by a selector 310 are "1". R1 is changed to zero in the other cases. R0 is sent out always as 0.

Numerals 307 to 309 designate priority circuits for selecting one of three input messages and producing a signal SX, SY or SP indicating a selected message. In the case under consideration, messages are selected in the order of arrival. In the case of FIG. 19A, the EX00 operates in the manner mentioned below against the partial broadcast message inputted from PE00. This message is set in an input buffer 300 and sent to the selector 310 and the path control circuit 306. In the process, since PB is "1", BC "0", R0 "1" and R1 "1", the output A of the partial broadcast path control circuit 403 becomes a binary 1, with the result that the output PX of the OR circuit becomes "1". In the priority circuit 307 (FIG. 4), on the other hand, the PX from the OR gate group 430 is received, and a control signal is generated in such a manner as to select the message sent from the input buffer 300 at the selector 310. The control signal thus generated is sent to the output port (1) 303. The selector 310 selects the message inputted from the input buffer 300 and changes the routing bits R0, 1 at the path control information alteration circuit 311. More specifically, since the R0, R1 inputted are binary 1, 1 respectively, R0, R1 are changed to binary 0, 1 respectively. The partial broadcast message for which R0, R1 have been changed is set in the output buffer 312 and sent out to XB-XO.

In the case where the message inputted from the PE is a normal message (PB=0, BC=0), it should be noted that the receiving PE number is decoded at the address decoder 400 to determine a transmission destination, and the signal is outputted to any of the OR gates 415 to 417. This is also the case with the remaining address decoders 401, 402.

In the case where the message inputted is a broadcast one, the embodiment under consideration operates in such a manner that (1) the broadcast message inputted from PE is sent to XB-X, (2) the broadcast message inputted from XB-X is sent to XB-Y, and (3) the broadcast message inputted from XB-Y is sent to PE.

In view of this, in the case where the message inputted from the PE is a broadcast message, BC is a binary 1. Therefore, the BC bit of the particular message is directly sent to the OR gate 415, and therefore the signal PX becomes a binary 1 with the message sent to the XB-X. In similar fashion, when the message inputted from the XB-X or XB-Y is a broadcast message, the BC bit in the particular message is sent to an OR gate 419 or 423 thereby to produce signals XY and YP respectively. The resulting message is applied to XB-Y or PE.

Figure 5:
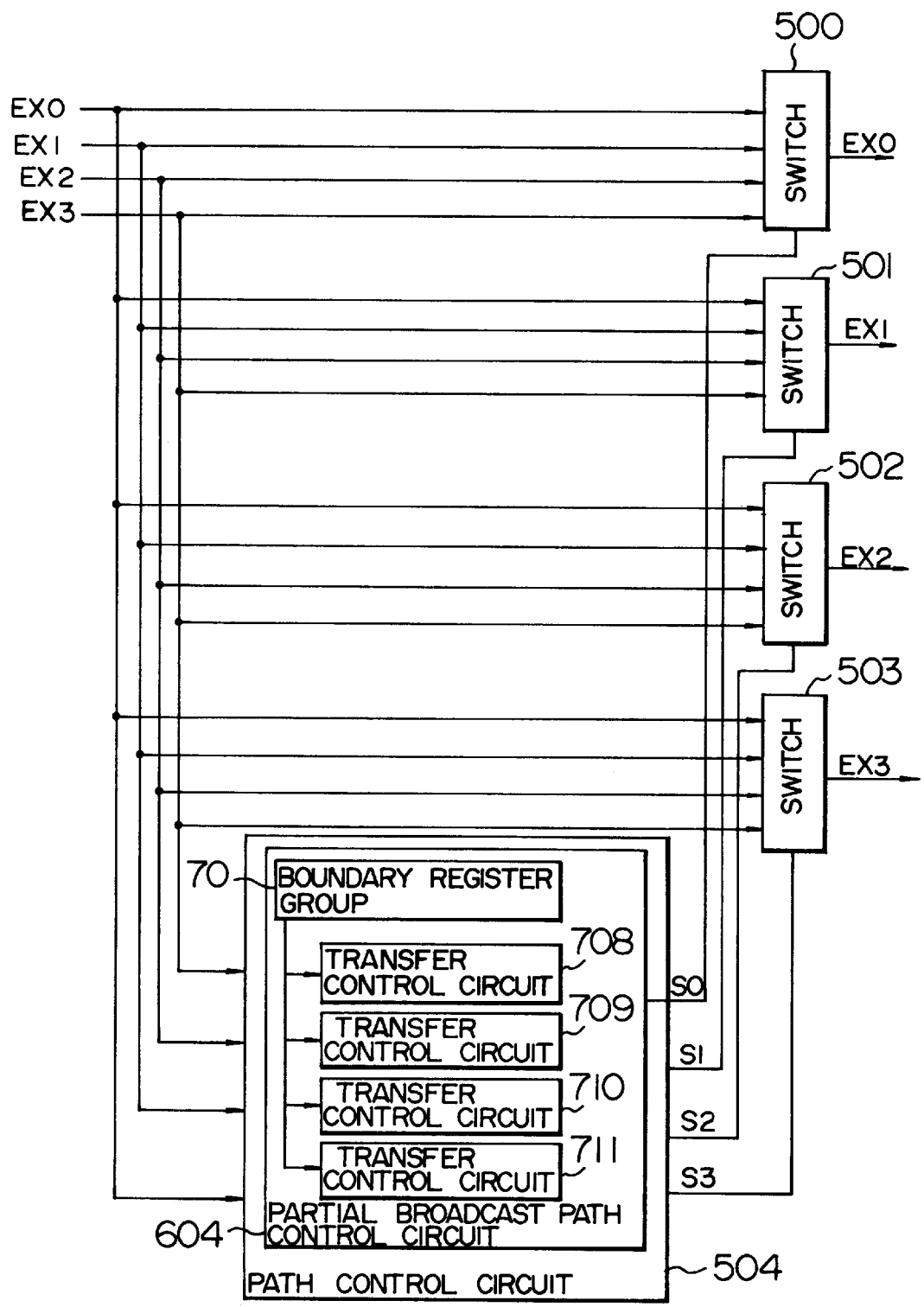
FIG. 5 is a diagram showing the configuration of a crossbar switch (XB).

FIG. 5 shows a configuration of an X-crossbar switch SB-X■ (■=0, 1, 2 or 3). The Y-crossbar switch is constructed in similar fashion. The input-output signals EX0 to EX3 in the diagram designate signals from EX■0 to EX■3 connected to the related crossbar switch. In the case of XB-XO, for instance, the input-output signals EXO to EX3 are replaced by EX00 to EX03. Numerals 500 to 503 designate switches for selecting one of the four input ports. XB designates a crossbar switch. Each of the inputs EX0 to EX3 is connected to the inputs of the switches 500 to 503, so that the message inputted from any of the inputs is directly supplied to the switches 500 to 503. The path control circuit 504 is for determining a switch from which a message inputted is to be transferred. Numeral 504 designates means for path control to determine the transmission destination of the message inputted from the four EXs. The feature of the present embodiment lies in that a partial broadcast control circuit 604 is included in the path control circuit 504. The circuit 604 is for determining whether a partial broadcast message inputted to XB and transferred to a given output port should be transferred further downstream. The partial broadcast path control circuit 604 includes a boundary register group 70 for holding information related to the processor group for implementing partial broadcast, and transfer control circuits 708 to 711 associated with the output ports for determining whether the processor associated each processor group is connected to downstream of each output ports.

Figure 6:
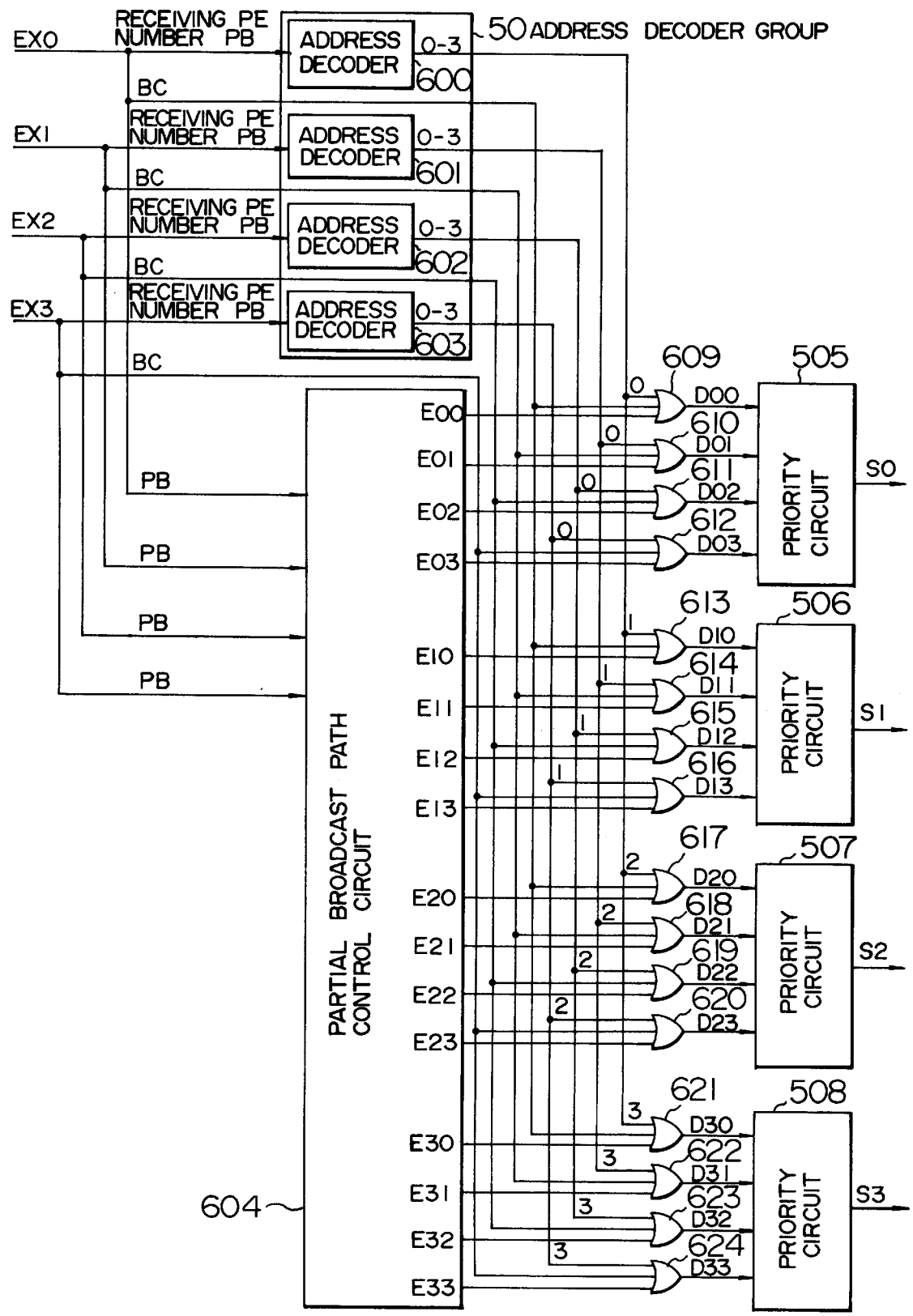
FIG. 6 is a diagram showing the configuration of a path control circuit shown in FIG. 5.

FIG. 6 shows the path control circuit 504 in detail. This circuit includes a partial broadcast path control circuit 604 for determining a transfer path of a partial broadcast message, an address decoder group 50, OR gates 609 to 624 and priority circuits 505 to 508.

The output Eij (i=0 to 3, j=0 to 3) of the partial broadcast path control circuit 604 is a signal indicating that the partial broadcast message inputted from EXj is to be transferred further to EXi. This output Eij is inputted through the OR gates 609 to 624 to the priority control circuits 505 to 508. These priority circuits are for determining the order of transmitting four messages inputted. It is determined in the order of arrival in the case under consideration. The output signals D00, D01, D02 and D03 of the OR gates 609 to 612 are signals for instructing the message inputted to be outputted to the EX0 and are generated from the messages inputted from EX0, EX1, EX2 and EX3 respectively. The output signals D10, D11, D12, D13 of the OR gates 613 to 616 are signals instructing a message to be outputted to EX1, output signals D20, D21, D22, D23 of the OR gates 617 to 620 to EX2, and output signals D30, D31, D32, D33 of the OR gates 621 to 624 to EX3. These signals are generated from the messages inputted from EX0, EX1, EX2 and EX3 respectively.

The address decoder group 50 includes address decoders 600 to 603 corresponding to input ports for decoding the receiving PE number in a message and determining the transmission destination of the message when such message as inputted to XB is a normal message.

In the case where the message inputted from EX0 is a normal message, for instance, the receiving PE number in the message is decoded at the address decoder 600 to determine a transmission destination in unique fashion. The address decoder 600 includes four signal lines #0 to #3 associated with the output ports. When one of them is set to a binary 1 in accordance with the receiving PE number, one of the outputs D00, D10, D20, D30 of the OR gates 609, 613, 617, 621 becomes a binary 1. When an inputted message is a broadcast message, i.e., when BC is a binary 1, the BC is directly applied to the OR gates 609, 613, 617, 621 so that D00, D10, D20 and D30 all become a binary 1. Thus EX0 to EX3 all become transmission destinations. This operation also applies to the messages inputted from other input ports.

Figure 7:
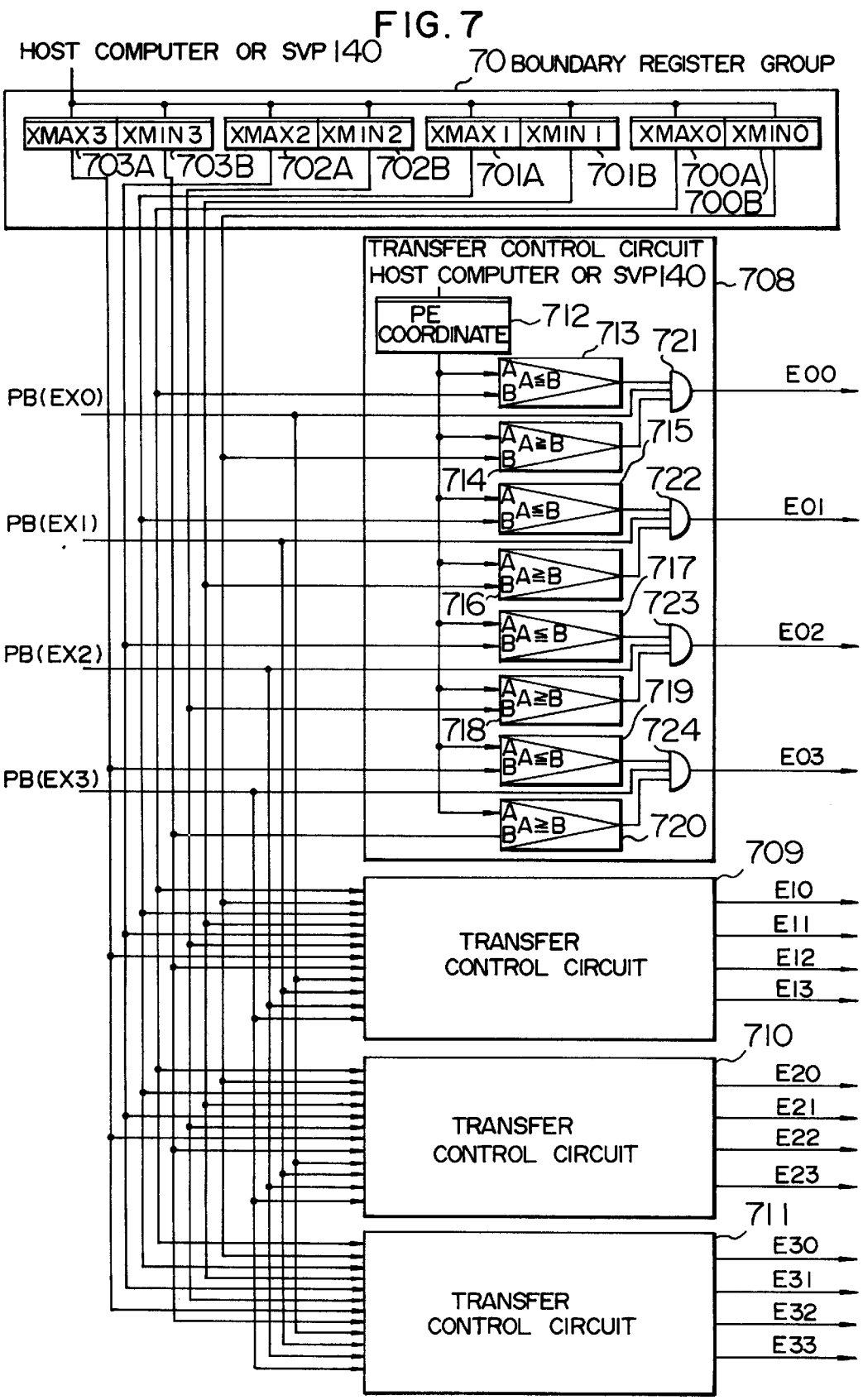
FIG. 7 is a diagram showing the configuration of a partial broadcast path control circuit shown in FIG. 6.

FIG. 7 shows the partial broadcast path control circuit 604 in detail. The boundary register group 70 includes a plurality of register pairs, each of which is associated with an input port of the crossbar switch. According to the present embodiment, 700A and 700B correspond to an input port connected to EX0. In similar fashion, 701A and 701B correspond to an input port connected to EX1, 702A and 702B to an input port connected to EX2, and 703A and 703B to an input port connected to EX3. Each register pair holds maximum and minimum address values of the related processor group when the PE connected to the EX of a corresponding input port belongs to the particular processor group. The register 700A, for example, holds the maximum address value XMAX0 of the x coordinate of a processor group to which the PE connected to EX0 belongs. On the other hand, the register 700B holds the minimum value XMIN of the x coordinate of the same processor group. This is also the case with other register pairs which hold XMAXi, XMINi (i=1, 2 or 3).

Assuming that processor groups 50A to 50C are defined as shown in FIG. 19(A), for instance, the registers 700A, 700B of the crossbar switch XB-X0 connected to PE00 hold the maximum value 1 and minimum value 0 of the x coordinate of the processor group 50A. The registers 701A, 701B of the crossbar switch, on the other hand, have set therein the same values 1 and 0 identical to those mentioned above since the corresponding PE01 belongs to the same processor group. The registers 702A and 702B of the same crossbar switch, by contrast, have set therein the maximum value 3 and the minimum value 2 of the processor group 50B. The same value is also set in the registers 703A and 703B. When a line of processor groups is determined like the processor group 50D shown in FIG. 19(B), on the other hand, the registers 700A, 700B of the XB-X connected to PE00 hold the maximum value 0 and the minimum value 0 of the x coordinate respectively of the address of the processor group 50D. Also, even when a PE corresponding to a particular register pair belongs to no processor group, the x coordinate of the particular PE is held in the particular register pair. The values in the register group 70 are set in the host processor or SVP 140 before the partial broadcast is started.

Each of the transfer control circuits 708 to 711 is arranged to correspond to an output port (associated with a switch according to the present embodiment) for deciding whether the partial broadcast message transferred to the particular output port from a given input port should be transferred further downstream. The transfer control circuit 708, for example, which corresponds to the switch 500 (FIG. 5) for outputting a message to EX0, is for comparing the MAX and MIN coordinates in the register group 70 with the coordinate of the PE0 corresponding to the EX0 and deciding whether the PE0 belongs to the partial broadcast associated with a PE for each input port. Numeral 712 is a register for holding the coordinate of the PE itself, which register is connected through EX to the output of the switch 500 to be controlled. Numerals 713 to 720 designate comparator circuits, and numerals 721 to 724 AND circuits. The transfer control circuits 709 to 711 are configured in the same manner as 708. Although internal circuits are not shown, the explanation below will be made on the assumption that the same internal components are included as in the transfer control circuit 708.

The output signals E00 to E03 are indicative of the fact that when the messages inputted from the EX0 to EX3 respectively are partial broadcast, a partial broadcast message is outputted to EX0. In similar fashion, the output signals E10 to E13, E20 to E23, and E30 to E33, indicate that a particular partial broadcast message is outputted to EX1, EX2 and EX3, respectively.

Numerals 713 and 714 in the transfer control circuit 708, for instance, designate a pair of comparator circuits corresponding to the input port connected to EX0. In similar fashion, the pair of comparator circuits 715, 716 is associated with the input port connected to EX1, the pair 717, 718 with the input port connected to EX2, and the pair 719, 720 with the input port connected to EX3. Each comparator pair compares the value of a pair of boundary registers associated with a PE connected to a corresponding input port through an EX with the coordinate of the PE corresponding to the particular transfer control circuit and connected through an EX (say, EX0 for the transfer control circuit 708). When a partial broadcast message is transferred from an input port connected to EX2 is transferred to an output port connected to EX0, for example, the comparator pair 717, 718 compares the X-direction maximum and minimum coordinates in the pair of boundary registers 702A, 702B representing the X-direction range of the partial broadcast associated with PE2, with the x coordinate of PE0 in the register 712, so that if the latter is included in the range of the former, the AND gate 723 becomes "1". The AND gate 723 is of course supplied with a PB bit (designated as PB(EX2)) contained in the partial broadcast message inputted to the input port connected to EX2. When PE0 belongs to the partial broadcast range associated with PE2, the output E02 of the AND gate 723 becomes "1". This signal is applied through the OR gate 611 to the priority control circuit 505, at which upon selection of the signal E02, i.e., D02, the output 50 of the priority control circuit 505 causes the switch 500 to select the above-described partial broadcast message inputted from EX2 and transfers it to EX0.

When PE0 fails to belong to the broadcast range of the partial broadcast message inputted from EX2, however, the output E02 of the AND gate 723 remains "0", and the partial broadcast message is not transferred to PE0.

Now, the operation of a crossbar switch will be explained with reference to FIGS. 5, 6 and 7, taking XB-X0 as an example.

Figure 22:
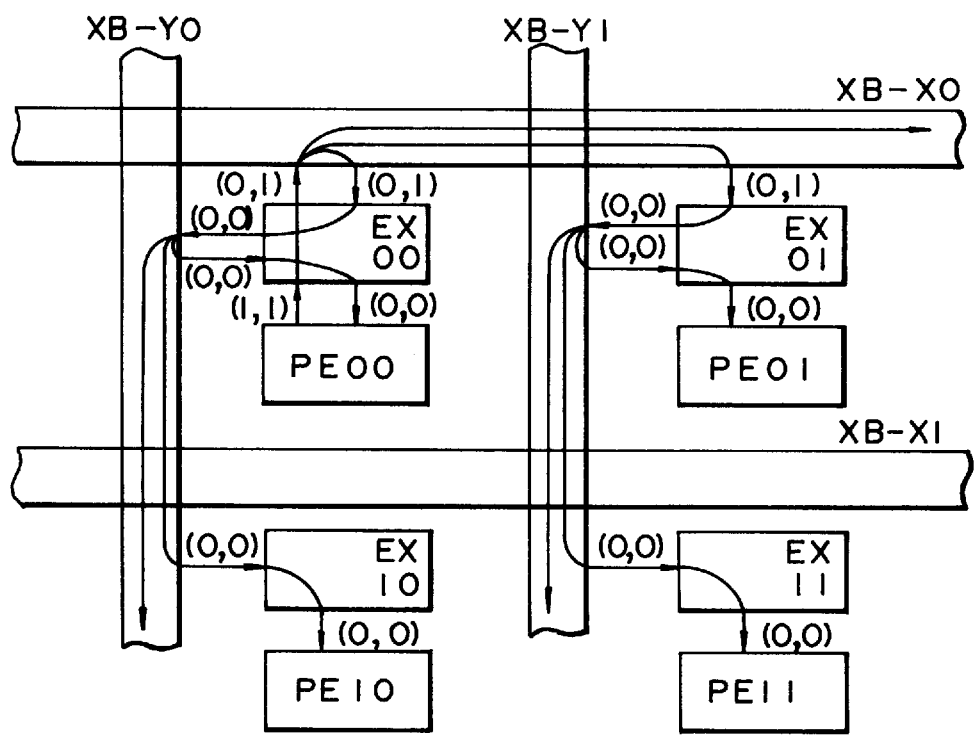
FIG. 22 is a diagram showing the transfer paths of partial broadcast messages for the partial broadcast ranges shown in FIG. 19A.

FIG. 22 is a diagram showing the transfer path of a partial broadcast message around PE00, 01, 10, 11 in the case of FIG. 19A. In FIG. 22, (1, 1), etc. designate a (R0, R1) bits attached to a message associated therewith. Specifically, (R0, R1) of the partial broadcast message sent out from PE00 is (1, 1), which is transferred to XB-X0 through EX00. In the process, (R0, R1) is altered to (0, 1). This message is transferred to EX00, EX01 by XB-X0 but not to EX02, EX03.

The message returned to EX00 is translated to YB-Y0 after (R0, R1) is changed to (0, 0). This message is retransferred to EX00, EX10 by YB-Y0 and then sent to PE00, PE10, but not EX20, EX30. YB-Y1 operates the same way.

In this way, partial broadcast is capable of being conducted in parallel between processors within the range 50A of FIG. 19A. Another feature of the present embodiment is that another message can be partially broadcast in another range of 50B, 50C at the same time.

The manner in which this operation is realized will be explained below.

In FIG. 5, the message inputted from EX00 is sent to switches 500 to 503 on the one hand while a part thereof is applied to the path control circuit 504 on the other hand. When this message is a partial broadcast one, PB is a binary 1 and BC a binary 0. Therefore, this circuit 504 determines the transfer destination of the message through the partial broadcast path control circuit 604. The PE coordinate register 712 in the transfer control circuits 708 to 711 (FIG. 7) of the circuit 604 has set therein the x coordinates 0, 1, 2, 3 of the PE coordinates 00, 01, 02, 03 connected through EX to the outputs of the switches 500 to 503, respectively. In the transfer control circuit 708, for instance, a comparator circuit 713 compares the value 1 of XMAX0 of the register 700A with the value 0 of the PE coordinate of the register 712 and produces a binary 1. The comparator circuit 714, on the other hand, compares the value 0 of XMIN0 of the register 700B with the value 0 of the PE coordinate of the register 712 and produces a binary 1. The AND gate 721 takes the logical product of the the outputs of the comparator circuits 713, 714 and PB, and outputs a signal E00 in "1" state. More specifically, according to the present embodiment, the partial broadcast message inputted from EX00 is always adapted to be retransferred to EX00. The operation in other transfer control circuits 709 to 711 is similar to the one performed in the transfer control circuit 708. The values of the corresponding outputs E10, E20, E30 therein, however, are dependent on whether PE01, PE02, PE03 belong to the partial broadcast range of PE00.

In the case of FIG. 19A, for instance, PE01 belongs to the same partial broadcast range as that of PE00 but PE02, PE03 do not. Therefore, E10 becomes "1", while E20, E30 "0".

Each XB-Y is constructed in substantially the same circuit as XB-X but is different therefrom in that the boundary register group 70 has set therein maximum coordinates YMAX0 to YMAX3 and minimum coordinates YMIN0 to YMIN3 along Y direction. In view of this, the output signals D00, D10 become "1", while D20, D30 remain "0" in FIG. 6. At the same time, the priority circuits 505, 506 take priority in such a manner as to select the message from EX00. More specifically, the two switches 500, 501 select the partial broadcast message inputted from EX00, which message is sent to EX00, EX01 but not to EX02, EX03.

A similar operation is performed in all aspects in EX00, EX01 connected to XB-X0 against the partial broadcast message. Take EX01 as an example. For EX01, PE XB-X and XB-Y in FIG. 3 are PE01, XB-X0 and XB-Y1. In FIG. 3, the partial broadcast message inputted from XB-X0 is set in the input buffer 301 and sent to the output ports 303 to 305 and the path control circuit 306. In the path control circuit 306, as shown in FIG. 4, the partial broadcast path control circuit 404 determines the transmission destination of this message. More specifically, the AND circuits 424 to 426 in this circuit 404 take the logical product of PB, R1, R0 in the message. In the case under consideration, PB, R1 are "1" and R0 "0", and therefore only the output signal B is "1" with the output XY of the OR gate 419 in a binary 1 state. Thus, it is decided that the partial broadcast message is to be transferred to XB-Y. This output signal XY is applied to the priority circuit 308, in which a control signal SY is generated in such a manner as to select the partial broadcast message inputted from XB-X0 set in the input buffer 301 by the output port (3)305 in FIG. 3. The output port (3), in which R0, R1 of the partial broadcast message selected by the selector 310 are binary 0 and 1 respectively, alters them to binary 0, 0 respectively through the alteration circuit 311, and the resulting signal is sent out through an output buffer 312 to XB-Y1. In similar fashion, EX00 sends out the same partial broadcast message to XB-Y0.

Now, explanation will be made about the operation of XB-Y1 against the same partial broadcast message with reference to FIGS. 5, 6 and 7. In XB-Y1, the input-output signals EX0 to EX3 in FIG. 5 become EX01 to EX31 respectively. XB-Y1 performs the same operation as XB-X0. Specifically, in FIG. 5, the partial broadcast message inputted from EX01 is sent to the switches 500 to 503 on the one hand while a part thereof is applied to the path control circuit 504. In the circuit 504, the PE coordinate register 712 in the transfer control circuits 708 to 711 in the partial broadcast path control circuit 604 has set therein the Y coordinates 0, 1, 2, 3 of the coordinates 01, 11, 21, 31 respectively of the PE connected through EX to the outputs of the switches 500 to 503 respectively. Also, in the case where the partial broadcast is 50A as shown in FIG. 19A, the register 700A in the boundary register group 70 has set therein a binary 1 as YMAX0, and the register 700B a binary 0 as YMIN0. The values of the registers 701A, 701B are also "1", "0" respectively. The registers 702A, 702B, on the other hand, have set therein 3, 2 respectively. This is also the case with the registers 703A, 703B.

As a result, the transfer control circuit 708 associated with EX01 has a comparator circuit 713 compare the value 1 of YMAX0 of the register 700A with the value 0 of the PE coordinate register 712, with the output of 1 produced, and the comparator circuit 714 compare the value 0 of YMIN0 of the register 700B with the value 0 of the PE coordinate register 712, with the output of 1 produced. In the AND circuit 721, the logical product of the results produced from the comparator circuits 713, 714 and PB is taken, and the output signal E00 is turned to a binary 1. In similar fashion, the transfer control circuit 709 associated with EX11 performs a similar operation to produce an output signal E10 in "1" state. Specifically, it is decided that the partial broadcast message under consideration is to be transferred to EX01, EX11 associated with PE01, 11 belonging to the same partial broadcast group 50A as for PE00. In the transfer control circuit 710 associated with EX21, on the other hand, the operation is identical but the content of the PE coordinate register 712 is 2 and is absent between YMIN0 (=0) and YMAX0 (=1), so that the output signal E20 becomes 0. The transfer control circuit 711 also produces an output signal E30 of zero.

As a result of these operations, in FIG. 6, D00, D10, D20, D30 become 1, 1, 0, 0 respectively. The priority circuits 505, 506 take priority in such a manner as to select the partial broadcast message inputted from EX01. Specifically, the two switches 500 and 501 shown in FIG. 5 select a partial broadcast message inputted from EX01 and send it to EX01, EX11. The partial broadcast message inputted from EX01 is not sent out to EX21, EX31.

EX01 and EX11 that have received the message from XB-Y1 are operated the same way. Take EX11 as an example. In EX11, PE of the the input-output signal is given as PE11, XB-X as XB-X1, and XB-Y as XB-Y1. The message inputted from XB-Y1 is set in the input buffer 302, and is sent to the output ports 303 to 305 and the path control circuit 306. The circuit 306 has the AND circuits 424 to 426 in the partial broadcast path control circuit 405 take the logical product of PB, R1, R0 in the message. Since PB is 1, and R1 and R0 is 0, only the output signal C becomes a binary 1 with YP also a binary 1. This output signal YP is applied to the priority circuit 309, and a control signal SP is generated in such a manner as to select a message from XB-Y1 set in the input buffer 302 by the output port (2)304. The output port (2) sends out the selected partial broadcast message to PE11. This message is also sent out to PE10 in EX10 in similar fashion.

XB-Y0 operates the same way so that the same partial broadcast message is sent out finally to PE00, PE10, PE01, PE11. As explained above, the partial broadcast within a processor group is realized without causing any wasteful data transfer.

The foregoing description concerns the partial broadcast in the range 50A of FIG. 19A. It will be seen from the foregoing description that a message can be partially broadcast also in other ranges 50B, 50C in parallel to the operation mentioned above.

Figure 23:
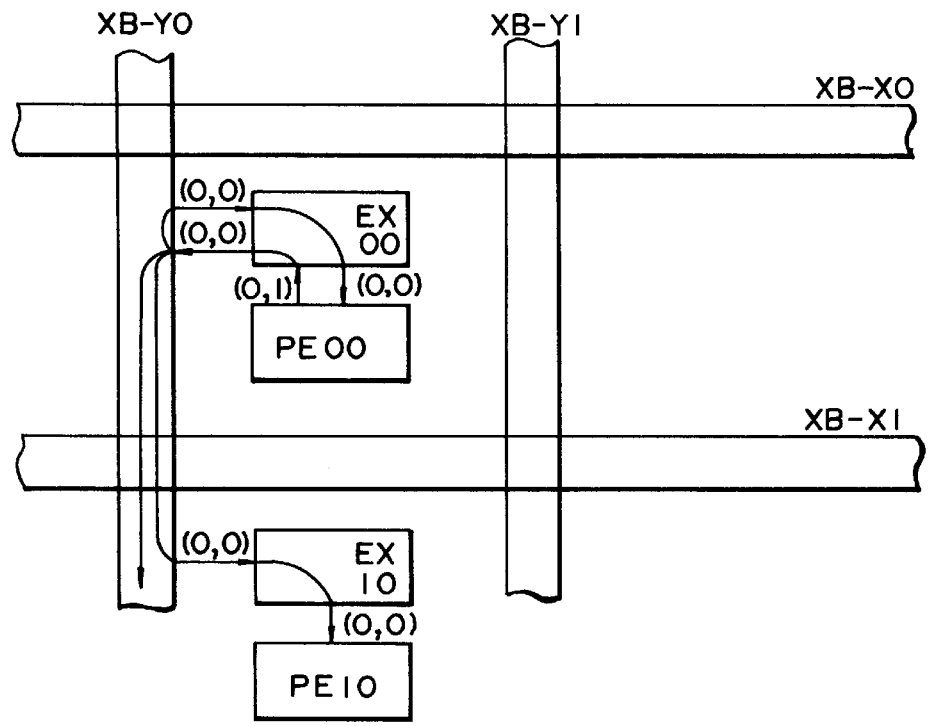
FIG. 23 is a diagram showing the transfer paths of partial broadcast messages for the partial broadcast ranges shown in FIG. 19B.
Figure 24:
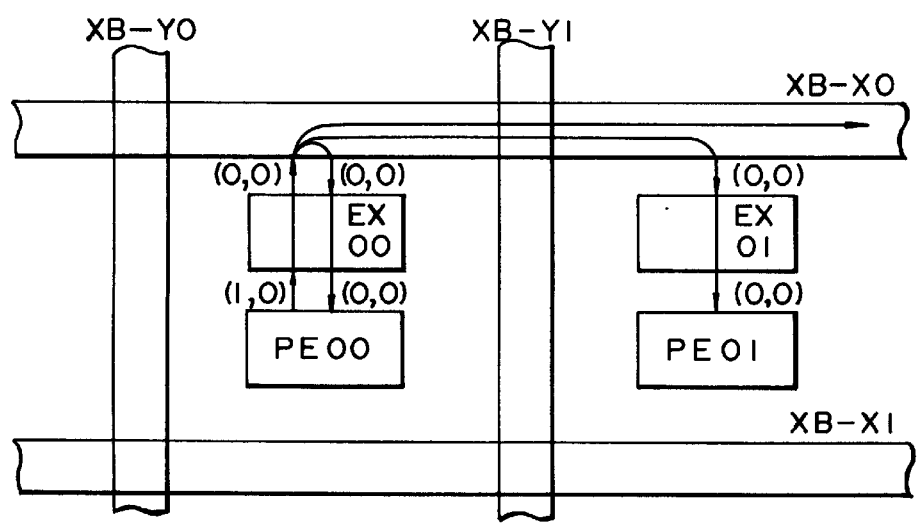
FIG. 24 is a diagram showing the transfer paths of partial broadcast messages for the partial broadcast ranges shown in FIG. 19C.

The transfer path of the partial broadcast message in FIG. 19B and the values of R0, R1 are shown in FIG. 23. In this case, the feature lies in that since a message is transferred to PE00, PE10 by EX00, EX10 when (R0, R1) bit is (0, 0), no transfer is made to YB-X0, YB-X1. More specifically, a line of PEs prevents wasteful transfer to another line. The transfer in the case of FIG. 19C is as shown in FIG. 24.

That is all there is to explain about the transfer operation of the partial broadcast message.

The broadcast message does not use the routing bits R0, R1, and each EX transfers a message in a specific direction by the BC bit in the message by the path control circuit 306. In FIG. 4, for example, the broadcast message inputted from PE turns the signal PX to "1" through an OR gate 415 and transfers this message to XB-X. Further, when a broadcast message is transferred to the particular EX from XB-X, the output signal XY of the OR gate 419 shown in FIG. 4 becomes "1" and the message is transferred to XB-Y. Furthermore, when a broadcast message is transferred to the particular EX from XB-Y, the output YP of the OR gate 423 is turned "1", whereby the particular message is transferred to PE. On the other hand, each XB controls the direction of transfer in the manner mentioned below by the path control circuit 504 as shown in FIG. 6. The broadcast message inputted from EX0, for instance, turns "1" the outputs of the OR gates 609, 613, 617, 621, whereby the particular message is transferred to the corresponding EX0, EX1, EX2, EX3 respectively. Thus, in combination with the above-mentioned EX operation, the broadcast message is transferred to all the PEs including the sending source through the route from PE00 to EX00 to XB-X0 to EX0j (j=0,1 or 3) to XB-Yi (i=0, 1 or 3) to PEij.

Also, the normal message, which is neither the broadcast message nor the partial broadcast message, is selectively transferred to a PE of the transmission designation PE number in the message by the address decoders 400 to 402 in EX and the address decoder group 50 in XB.

Figure 9:
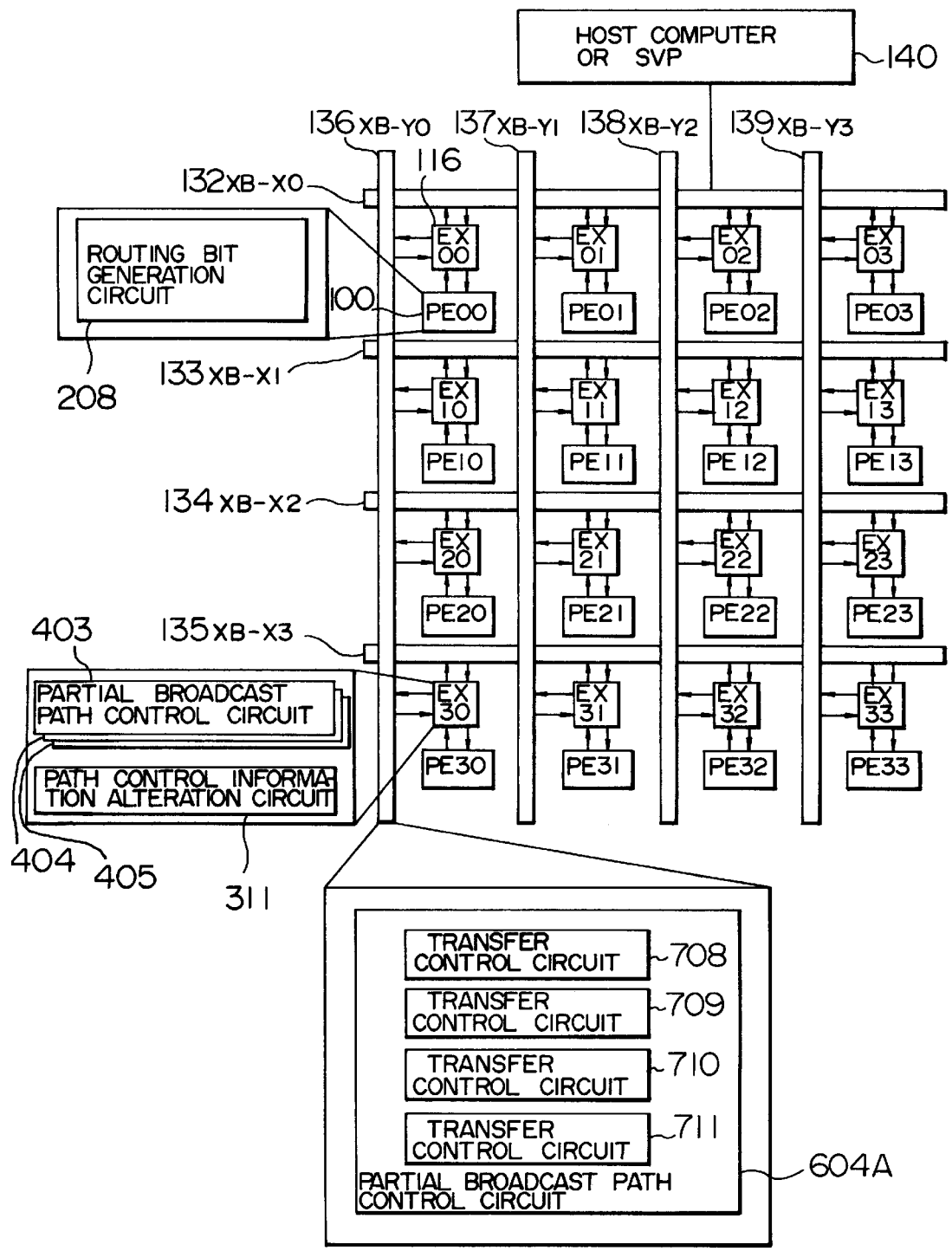
FIG. 9 is a diagram showing the configuration of a parallel computer according to a second embodiment of the present invention.

The configuration of a parallel computer according to the present embodiment is shown in FIG. 9. According to the second embodiment, eliminating the boundary register group 70 from the first embodiment, information on the range of message transfer is added in the partial broadcast message, by use of which the partial broadcast is determined in XB. The explanation below will be confined to the difference from the first embodiment.

FIG. 12 shows a format of a message used for data transfer between processors according to the present embodiment. This message has a MAX coordinate, a MIN coordinate as transfer control information in addition to the message transmission PE number, the receiving PE number, the two routing bits (R0, R1), the CTL bit and the data shown in FIG. 8A. The MAX coordinate includes the maximum Y- coordinate YMAX and the maximum X-coordinate XMAX of the processor group for transferring the message. The MIN coordinate similarly includes YMIN and XMIN. In FIG. 12 concerning the partial broadcast message, the transmission PE number, etc. is not used for the same reason as in FIG. 8B.

Figure 10:
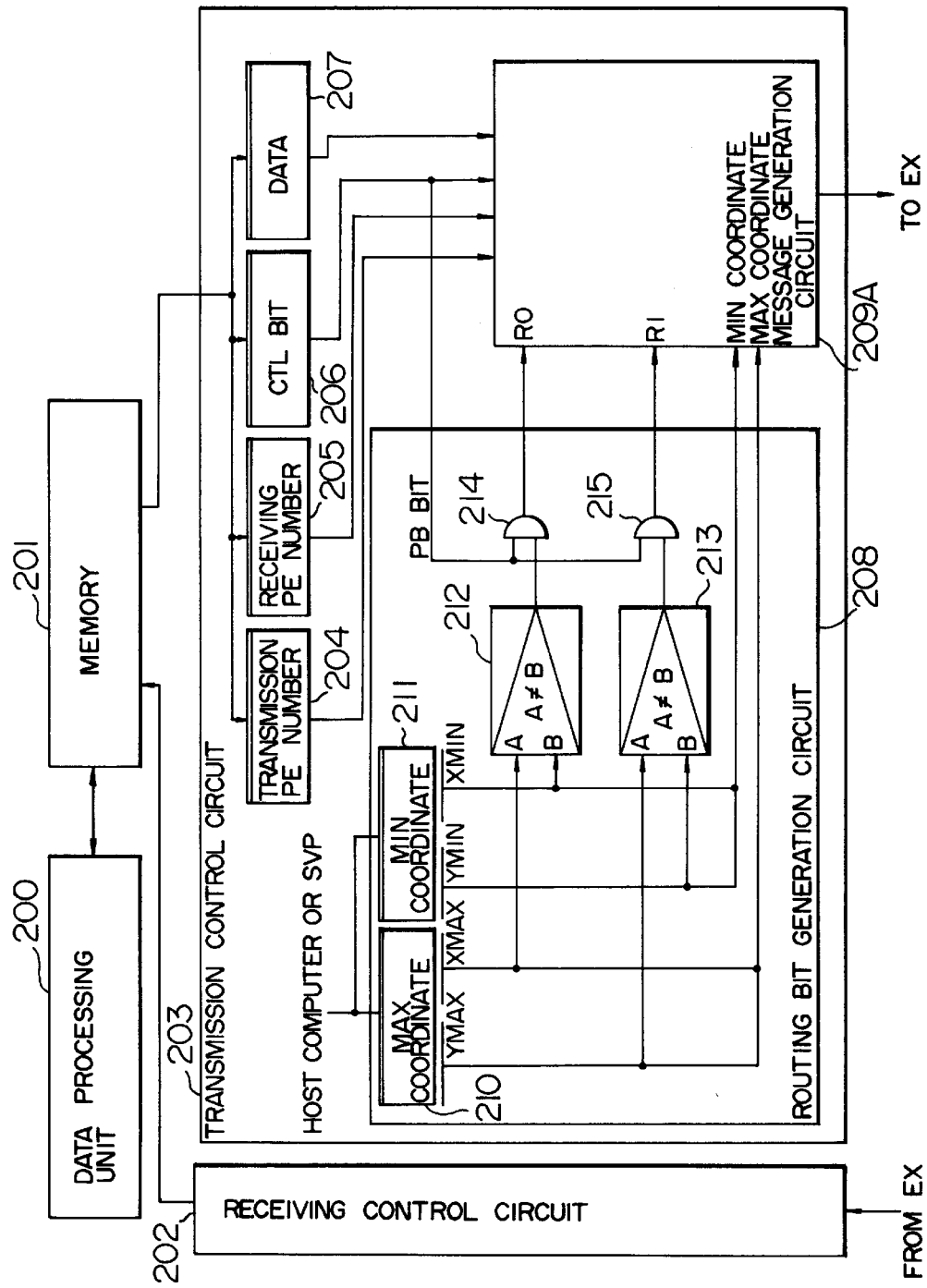
FIG. 10 is a diagram showing the configuration of a processor element (PE) shown in FIG. 9.

For transferring a message, a message for transmission is generated in PE00. FIG. 10 shows the configuration of PE. In FIG. 10, the same reference numerals as those in FIG. 2 designate similar component parts respectively. The PE shown in FIG. 10 is different from that shown in FIG. 2 only in that when a message generation circuit 209A generates a partial broadcast message, the contents of the registers 210, 211 are included therein.

XB in the present embodiment is identical to that in the first embodiment in other than the fact that the partial broadcast path control circuit is different.

FIG. 11 shows the configuration of the partial broadcast path control circuit 604A according to the present embodiment. Although information applied to this circuit is limited to PB in the partial broadcast message in the circuit 604 of the first embodiment (FIG. 7), the present embodiment is such that the MAX coordinate (YMAX, XMAX) and the MIN coordinate (YMIN, XMIN) in the message are compared with the contents of the PE coordinate register 712 in each of the transfer control circuits 708 to 711. For this reason, the boundary register group 70 in the first embodiment is not used. The remaining points are the same as in FIG. 7.

Now, explanation will be made about the operation of the partial broadcast path control circuit 604A with the partial broadcast message from PE00 transmitted further to XB-X0 from EX00. In the transfer control circuit 708, 709, 710 or 711 of the circuit 604A, the XMAX, XMIN in the input message are compared with the PE coordinate in the PE coordinate register 712. In the case of the partial broadcast message inputted from EX00, it is decided by the comparators 713, 714 at, say, the transfer control circuit 709, whether the the contents (1 in the case under consideration) of the PE coordinate register 712 are present between XMAX (1 in the present case) and XMIN (0 in the present case) in the message. It is also decided whether the PE belonging to the partial broadcast range designated by the same message is connected downstream of the switch 501 (FIG. 5), i.e., the transfer control circuit 709. According to the present embodiment, the signal E10 turns "1" and is transferred to EX01. The subsequent operation is identical to that in the first embodiment and will not be described. It will be understood that this method prevents the message from being transferred to the PE in the region 50B shown in FIG. 19A.

After all, the present embodiment also permits partial broadcast of a message in parallel between PEs belonging to a partial broadcast range, in parallel to the partial broadcast in other partial broadcast ranges. In addition, according to the present embodiment eliminating the boundary register group unlike in the first embodiment, the circuit is further simplified.

Figure 13:
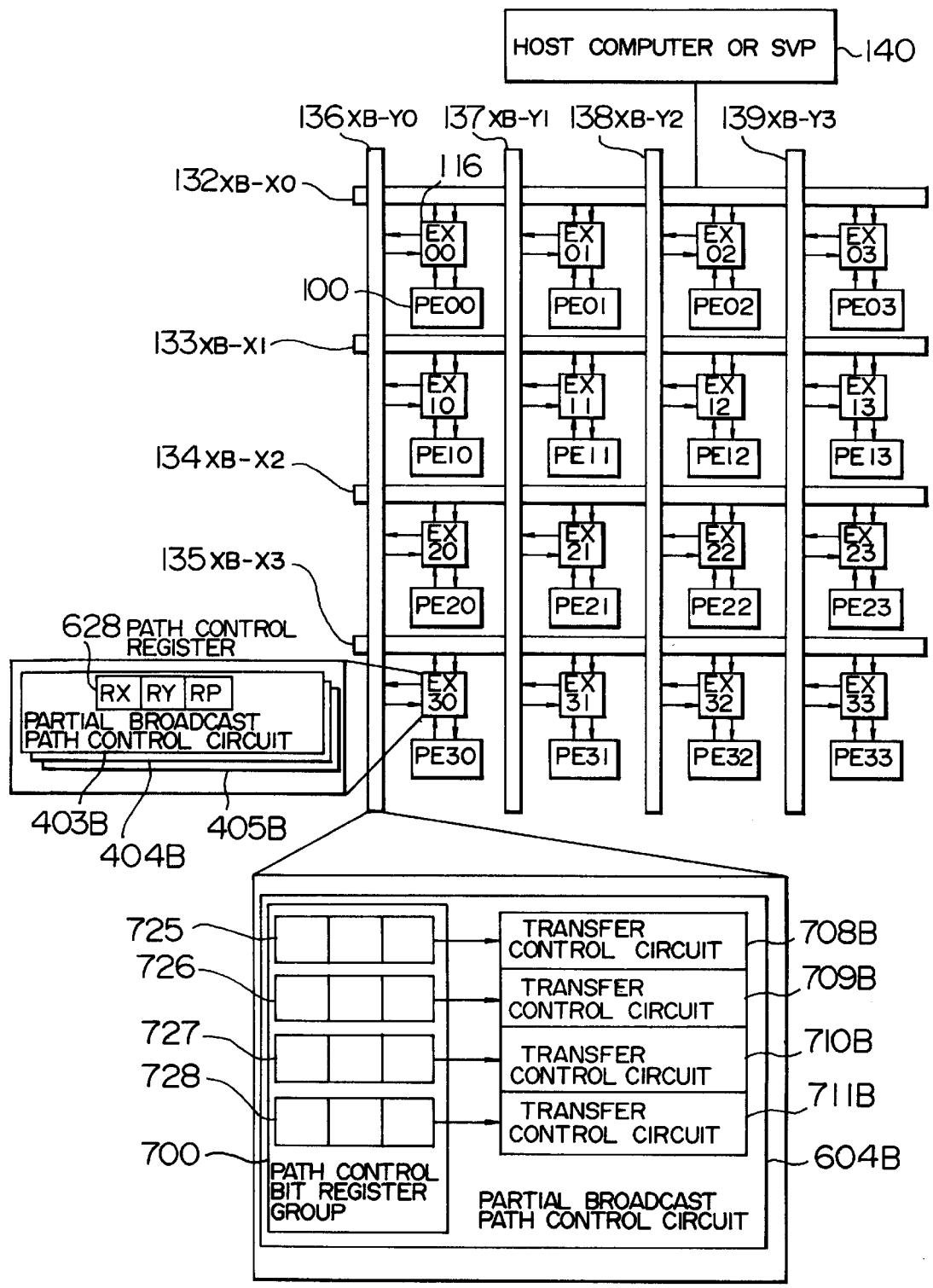
FIG. 13 is a diagram showing the configuration of a parallel computer according to a third embodiment of the present invention.

According to the first embodiment, a coordinate data representing the range of a processor group is held in the boundary register group 70 (FIG. 7) as transfer control information. According to the present embodiment, by contrast, each output port of EX, XB has the transfer control information including data send control bits associated with all input ports, and the bit value is used to decide whether a data should be sent out or not. The explanation that follows will be confined to the difference from the first embodiment. The configuration of a parallel computer according to the present embodiment is shown in FIG. 13. In FIG. 13, the same reference numerals as those in FIG. 1 designate corresponding parts respectively. The difference of the present embodiment from FIG. 1 lies in that the routing bit generation circuit is absent in each PE according to the present embodiment, that the partial broadcast path control circuits 403B to 405B in each EX of the present embodiment have a path control bit register 628, and that the boundary register group 70 in each XB is replaced by the path control register bit register 700, and that the transfer control circuits 708B to 711B control the transfer of a partial broadcast message by the value of the bits in the register group 700.

Figures 17, 18:
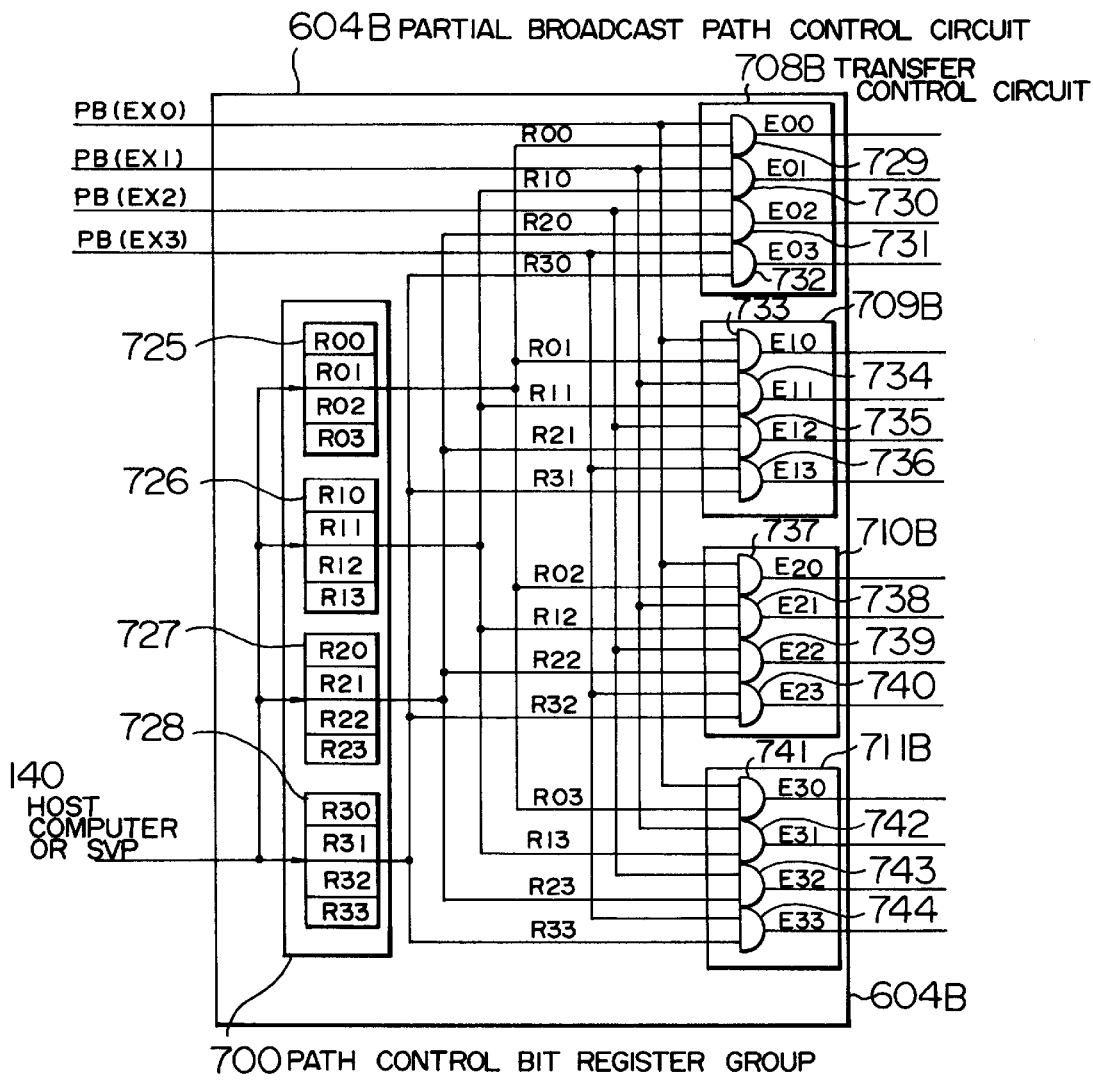
FIG. 17 is a diagram showing the configuration of a partial broadcast path control circuit included in the crossbar switch (XB) shown in FIG. 5.
FIG. 18 is a diagram showing the format of a message according to the third embodiment.

A format of a message according to the present embodiment is shown in FIG. 18. This message lacks the routing bits R0, R1 unlike in FIG. 8.

Figure 14:
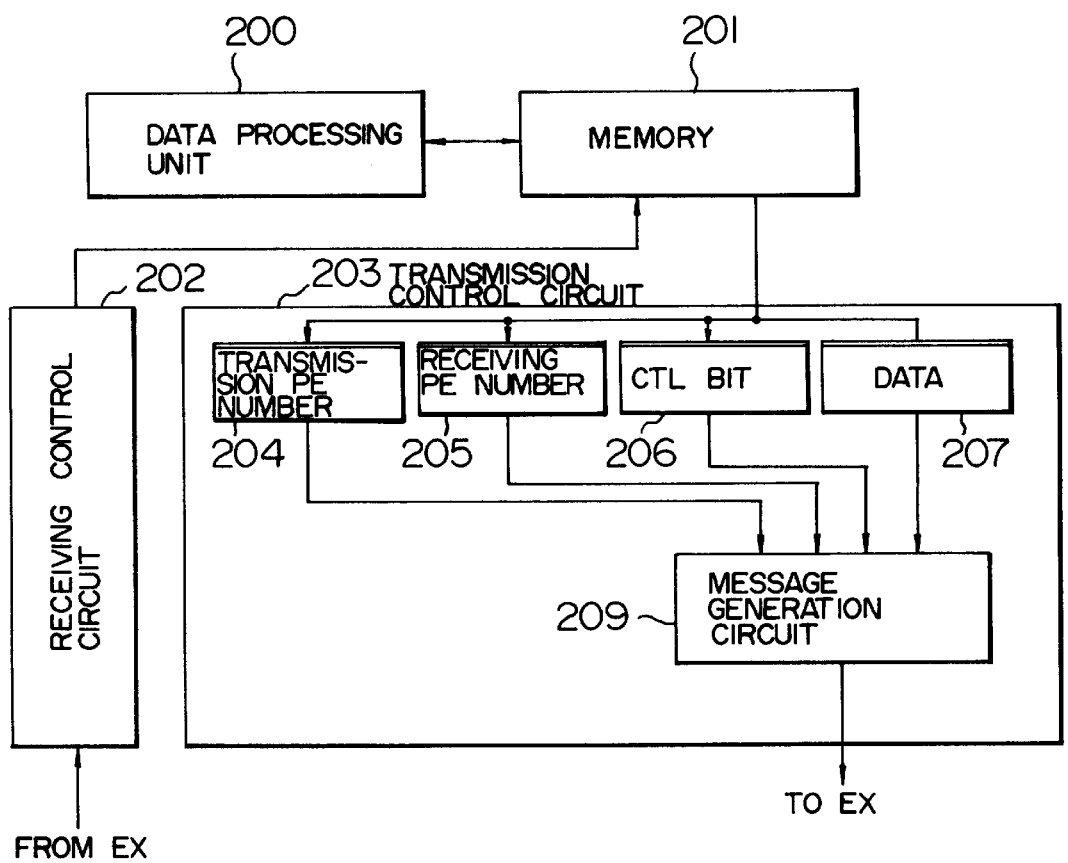
FIG. 14 is a diagram showing the configuration of the PE shown in FIG. 13.

FIG. 14 shows a configuration of PE. In FIG. 14, the same reference numerals as those in FIG. 2 designate similar component parts respectively. Each PE is different from FIG. 2 only in that the routing bit generation circuit 208 (FIG. 2) is lacking in the construction FIG. 14.

Figure 15:
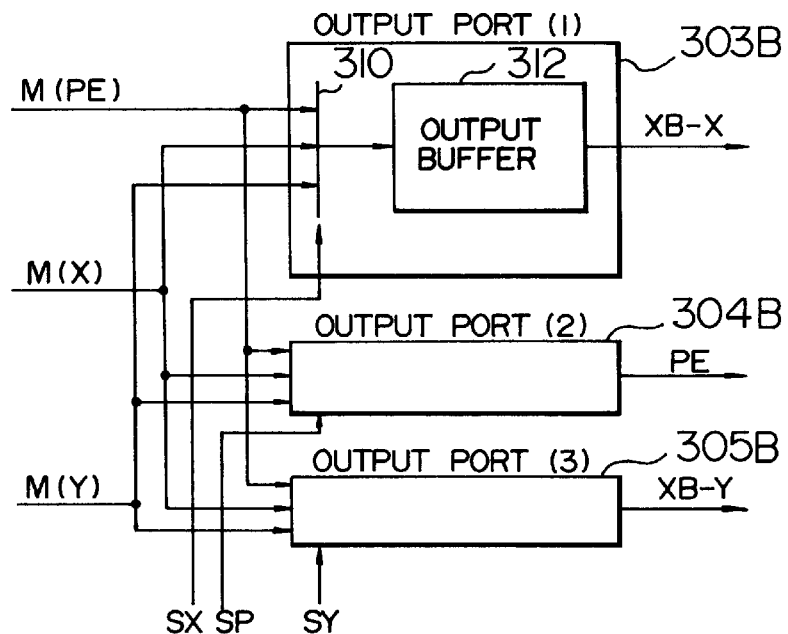
FIG. 15 is a diagram showing the configuration of an output port included in the exchange switch (EX).
Figure 16:
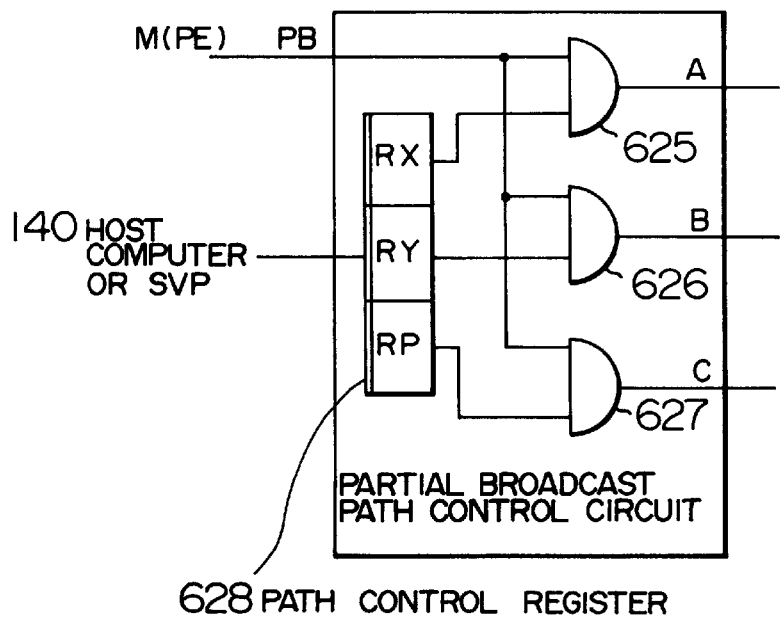
FIG. 16 is a diagram showing the configuration of a partial broadcast path control circuit included in the exchange switch (EX) shown in FIG. 13.

Each EX is different from FIG. 3 only in the output port and the partial broadcast path control circuit. A configuration of the output port 303B according to the present embodiment is shown in FIG. 15. The component parts other than the path control information alteration circuit 311 (FIG. 3) are identical to the corresponding parts in FIG. 3. This also applies to the output ports 304B, 305B. FIG. 16 shows an internal configuration of the partial broadcast path control circuit 403B for the partial broadcast message from PE. In FIG. 16, numeral 628 designates a path control register for holding the transfer control information having send control bits RX, RY, RP corresponding to the respective transmission destinations XB-X, XB-Y and PE. These send control bits indicate whether the partial broadcast message inputted from an input port connected to PE should be transferred to the destinations XB-X, XB-Y and PE. One of the bits RX, RY and RP is set to "1" beforehand after determining whether a partial broadcast message is to be transferred to one of XB-X, XB-Y and PE. Other of the bits RX, RY and RP are set to "0". These send control bits are calculated and set by the external software (such as SVP 140 for the host computer) in advance (at the time of loading a program in PE). The partial broadcast path control circuits 404B, 405B (FIG. 13) for other input ports are configured in a similar manner.

In partial broadcast mode, i.e., when PB is 1, the partial broadcast path control circuits 403B to 405B determine the transmission destination of a message by the values of the send control bits RX, RY, RP that have been set. More specifically, when PB is 1 and the bit RX of the register 628 is 1, the output A of the AND circuit 625 (FIG. 16) is 1, and therefore the XB-X becomes a transmission destination. When PB is 1 and the bit RY of the register 628 is 1 at the same time, the output B of the AND circuit 626 is 1, and therefore XB-Y is a transmission destination. When PB is 1 and the bit RP of the register 628 is 1, on the other hand, the output C of the AND circuit 627 is 1, and therefore PE becomes a transmission destination. In the case of FIG. 19A, for example, at EX00, the partial broadcast path control circuit 403B has only the bit RX of the register 628 in "1" state, and the partial broadcast message sent from PEOO is sent out to XB-X0 as in the first embodiment.

The embodiment under consideration is different from the first embodiment only in the partial broadcast path control circuit 604B, and has a configuration as shown in FIG. 17. Numerals 725 to 728 designate path control bit registers arranged for respective input ports for holding the send control bits corresponding to the respective output ports. More specifically, the register 725 holds send control bits R00 to R03 for a partial broadcast message inputted from EX0. In similar fashion, the registers 726, 727, 728 hold the send control bits (Rij (i=1 to 3, j=0 to 3)) of partial broadcasts message inputted from EX1, EX2, EX3, respectively. The send control bit Rij (i=0 to 3, j=0 to 3) is a bit for indicating whether the partial broadcast message inputted from the i-th input port should be translated to the j-th output port, so that R00, R10, R20, R30 are turned "1" respectively beforehand if partial broadcast messages respectively inputted from EX0 to 3 are to be outputted to EX0. Bits R01, R11, R21, R31 are turned "1" respectively beforehand if partial broadcast messages respectively inputted from EX0 to 3 are to be transferred to EX1 respectively. In similar manner, R02, R12, R22, R32 are respectively turned "1" beforehand if the transmission destinations of partial broadcast messages respectively inputted from EX0 to 3 are EX2 respectively. R03, R13, R23, R33 are respectively turned "1" beforehand if the transmission destinations of partial broadcast messages inputted from EX0 to 3 is to be outputted EX3 respectively. The transfer control circuits 708B to 711B have four AND gates for taking the logical product of the contents of the registers 725 to 728 and the PB bits in the partial broadcast message inputted from different input ports. These registers 725 to 728 are subjected to calculations and setting by an external software (such as when a host computer or SVP 140) in advance (such as when a program is loaded in PE). The output signals E00 to E03 of the AND gates 729 to 732 are for indicating that a message inputted from EX0 to EX3 is outputted to EX0 when partially broadcast. Similarly, the output signals E10 to E13 of the AND gates 733 to 736 are signals indicating an output to EX1, the signals E20 to E23 an output to EX2, and the signals E30 to E33 an output to EX3.

Now, the operation of XB-X will be explained with reference to FIGS. 5 and 17 taking XB-X0 as an example in the case of FIG. 19A. The partial broadcast path control circuit 604B in FIG. 17 has 1, 1, 0, 0 set in R00 to R03 respectively of the register 725 in XB-X0 in advance. This is for the purpose of sending a partial broadcast message from PE00 to PEO0, PE01 but not to PE02, PE03 in the case of FIG. 19A. As a result, the AND circuits 729, 733, 737, 741 take the logical product of the value of the register 725 and PB, and produce output signals E00, E10 all in "1" state while E20, E30 remain "0". After that, as in the operation of the first embodiment, the two switches 500, 501 (FIG. 5) select the message inputted from EX00 and send it to EX00, EX01 but not to EX02, EX03.

EX00 to EX01 connected to XB-X0 perform the same operation against the partial broadcast message thus translated. Take EX01 as an example. The partial broadcast path control circuit 404B (FIG. 13) corresponding to XB-X0 of EX01 includes a path control bit register 628 which has set therein 0, 1, 0 in advance as bits RX, RY, RP respectively. This is because in the case of FIG. 19A, as illustrated in FIG. 22, the partial broadcast message transferred from XB-X0 is required to be transferred to YB-Y1. These bits are applied to AND circuits 625 to 627 for producing the logical product with PB in the input message. As a result, only the output signal B turns "1". The partial broadcast message sent from XB-X0 is thus applied to XB-Y1 by EX01. In similar manner, the message is sent out to XB-Y0 by EX00.

Now, the operation of XB-Y1 against this message will be explained with reference to FIGS. 5 and 17. XB-Y1 according to the present embodiment has set therein 1, 1, 0, 0 in R00 to R03 respectively of the path control bit register 725 in advance. This is by reason of the fact that the partial broadcast message transferred from EX01 to YB-Y1 is transferred to PE01, PE11 but not to PE21, PE31. As a result, the AND circuits 729, 733, 737, 741 take the logical product of the respective values in the register 725 and PB, so that 1 is produced as output signals E00, E10 and 0 as E20, E30. Subsequently, as in the operation of the first embodiment, two switches 500 and 501 (FIG. 5) in XB-Y1 select the partial broadcast message inputted from EXO1, which message is sent to EX01, EX11. This message, however, is not sent output to EX21, EX31.

EX01 and EX11 that have taken this message from XB-Y1 perform the same operation. Take EX11 as an example. In EX11, the partial broadcast path control circuit 405B (FIG. 13) associated with XB-Y1 includes a register 628 that has set therein 0, 0, 1 as bits RX, RY, RP in advance. This is in view of the requirement to transfer the partial broadcast message inputted from XB-Y1 only to PE11. In FIG. 16, the logical product of these bits and PB are taken at AND circuits 625 to 627, and a "1" signal is produced only for the output signal C. As a result, the partial broadcast message from XB-Y1 is sent to PE11 by EX11. Also in EX01, this message is sent to PE01. XB-Y0 operates similarly, so that the message is sent finally to PE00, PE10, PE01, PE11.

As will be seen from above, a send control bit for confining the message transfer destination is capable of realizing a partial broadcast for transferring a message only to PE in a processor group without causing any wasteful data transfer.

According to the first and second embodiments, a rectangle is assumed as the range of a processor group. If a data send control bit is used as according to the present embodiment, however, it is possible to designate the range of a processor group of a desired shape. Also, it is not necessary to prepare a multiplicity of comparator circuits in XB unlike in the first or second embodiment, thereby reducing the circuit size.

[Modifications]

(1) In the case where a plurality of ranges of partial broadcast may be fixed in the first embodiment, a couple of boundary registers may be used for a plurality of input ports associated with the same partial broadcast range in the boundary register group 70 shown in FIG. 7.

(2) Further, according to the first embodiment, a couple of registers representing a given range of the boundary register group 70 may be used when the partial broadcast is allowably confined to the particular range in a parallel computer.

(3) Although the first embodiment includes, in each output port, a plurality of couples of boundary registers each associated with a plurality of input ports, the following modification is possible. In FIG. 7, for instance, boundary register pairs as many as the maximum possible number of partial broadcast ranges in the parallel computer system are inserted in place of the boundary registers 70. Each register pair has stored therein the maximum Y coordinate and the maximum x coordinate representing a corresponding partial broadcast range. A register for holding an ID bit indicating a specific register pair associated with a given input port and a circuit for selecting a register pair by the ID bit in the register and sending it out to the transfer control circuits 708 to 711, may be interposed between the transfer control circuits 708 to 711 and the particular pairs. Unlike the first embodiment in which each crossbar switch requires twice as many registers in the boundary register group as the input ports of each crossbar switch, registers twice as many as the partial broadcast ranges are required according to the modification under consideration, thereby saving the circuits when partial broadcast ranges are small in number.

(4) In place of the boundary register group 70 according to the first embodiment, a plurality of boundary register pairs representing a plurality of partial broadcast ranges usable in a parallel computer are installed for respective output ports. According to the first embodiment, the switches 500 to 503 (FIG. 5) in each crossbar switch are selectively turned on against a partial broadcast message. The modification under consideration, by contrast, may include a partial broadcast path control circuit by which all the switches are turned on against the particular broadcast message and then it is determined whether to open or not another gate arranged at the output of each switch. In this method, the partial broadcast path control circuit decides whether the output of each switch has a PE associated with any of a plurality of partial broadcast ranges used by the parallel computer thereby to control the gate at the output of the particular switch. For this purpose, a boundary register group representing a plurality of partial broadcast ranges is arranged for the switches, i.e., the output ports, and a transfer control circuit is used to decide whether a PE connected to the output port belongs to any of the partial broadcast ranges on the basis of the coordinate of the PE and the boundary register group. This modification may include as many boundary registers (which are fewer than in the first embodiment) as the modification (3) described above. The disadvantage of this method, as will be easily seen, however, is that since a partial broadcast message is selected in spite of the possibility of no transfer being made by each switch of XB, another message which could be selected according to the first embodiment cannot be selected. In this respect, the first embodiment is superior to the present modification.

(5) In the first and second embodiments, the coordinate representing the partial broadcast range held in each PE may also be held in each EX. Specifically, the routing bit generation circuit 208 (FIG. 2) may be included in each EX. In the case of partial broadcast, R0, R1 is added to the message at EX corresponding to the sending-end PE according to the first embodiment, while R0, R1, MAX coordinate and MIN coordinate are added to a message at EX associated with the sending-end PE. This modification permits the circuit addition in partial broadcast simply by EX or XB switch circuits and eliminates the need of PE circuit change.

(6) Although each of the first to third embodiments includes a plurality of transfer control circuits in a partial broadcast path control circuit, a single transfer control circuit may alternatively be used to make decision with sequentially different boundary register couples.

(7) The network including two-dimensional crossbar switches used in the first to third embodiments may be replaced by at least three-dimensional crossbar switches with equal effect.

(8) The crossbar switches may be also replaced by a network having a multiple-stage switch.

[Applications]

Assume that partial broadcast is desired from a host computer 140 or a processor to a processor group not associated with the particular processor. Take FIG. 19A, for example, where it is assumed that partial broadcast is desired from PE00 to the range 50C including PE20 to PE23 and PE30 to PE33. A normal message for demand is transferred to one of the PEs, say, PE20 of the range 50C by a program under execution at PE00, and the desire is met by partial broadcast from PE20 to PE23 and PE30 to PE33. When partial broadcast is desired to two or more processor groups from a PE, for instance, from PE00 to the range 50B, 50C in FIG. 19A, the same program of PE00 is used to transfer a normal message for demand to the PEs, say, PE02 and PE20 in the respective ranges, so that partial broadcast is effected within the ranges 50B, 50C from PE02 and PE20 respectively. When it is desired to effect partial broadcast in a processor range not rectangular by use of the first or second embodiment, on the other hand, the particular range is divided into a plurality of rectangular areas, and the partial broadcast is requested of a PE in each area.

[Other embodiments]

A fourth embodiment of the present invention will be described below with reference to the accompanying drawings.

This embodiment provides a parallel computer using a crossbar switch of special construction preferable for a variety of numbers of processors. More specifically, the crossbar switch according to the present embodiment is constructed in a manner logically splittable into a plurality of crossbar switch units. For example, it may be split into a plurality of crossbar switch units having different numbers of input-output ports. These crossbar switch units are usable for either x or Y direction.

Figure 25:
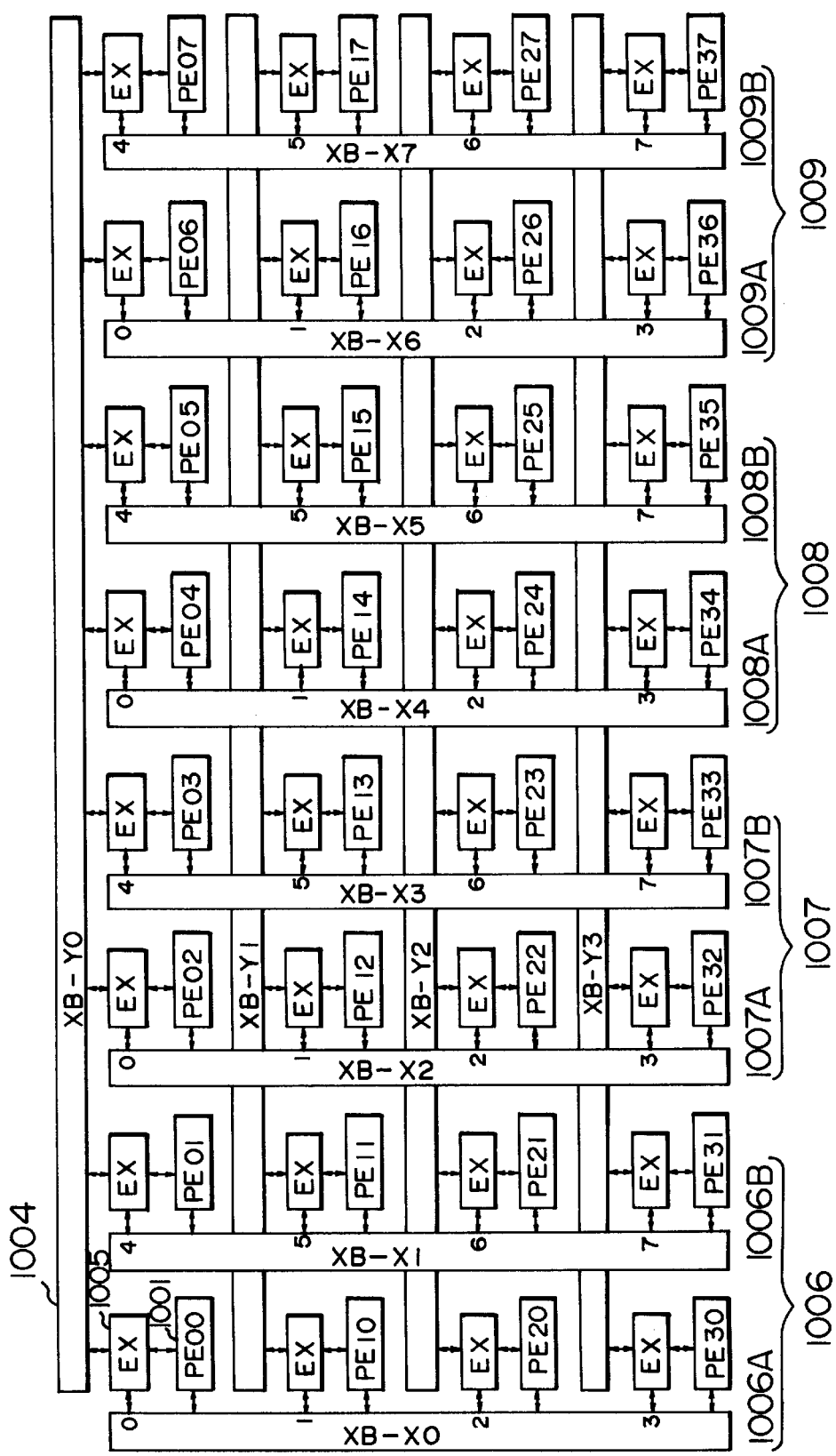
FIG. 25 shows another embodiment of the parallel computer used according to the present invention.

FIG. 25 is a diagram showing an example of configuration of a parallel computer according to the present invention. In this parallel computer, the element processors PE making up component parts thereof are connected by a network defined as follows: Each element processor PE is arranged on a two-dimensional grid, and the element processor PE groups on each column or row are connected by a mutual connecting network (crossbar switch). This network will hereinafter be referred to as a two-dimensional hypercrossbar network.

FIG. 25 shows an example of parallel computer using a two-dimensional hypercrossbar network including 32 (4×8) element processors PE.

In FIG. 25, numeral 1001 designates an element processor (PE), numeral 1004 an 8-input 8-output crossbar switch (XB-Y) on the row, and numeral 1005 a 3-input 3-output exchange switch (EX). Numerals 1006A, 1006B, 1007A, 1007B, 1008A, 1008B, 1009A, 1009B designate 4-input 4-output crossbar switch units (XB-X) on the column respectively. According to the present embodiment, crossbar switch pairs 1006A–1006B, 1007A–1007B, 1008A–1008B and 1009A–1009B on the column are crossbar switch units (hereinafter referred to as the split crossbar switches) obtained by logically splitting each of the 8-input 8-output crossbar switches 1006, 1007, 1008 and 1009 respectively. As a result, the crossbar switches on both row and column can be configured of the same type of split 8-input 8-output crossbar switches. According to the prior art, the construction of a crossbar network as shown in FIG. 25 requires an 8-input 8-output crossbar switch and a 4-input 4-output crossbar switch. According to the present embodiment, by contrast, the same network can be constructed of the same type of 8-input 8-output crossbar switches, thereby reducing the design and production costs of the network.

The numerical character in each element processor PE designates an element processor number (PE number) expressed by two-digit octal number. As a result of the indication on octal notation, the digit in the order of 10 corresponds to the port number of XB-X, and the one in the order of unity to the port number of XB-Y. The exchange switch EX connected with this element processor also has the same exchange switch number (EX number) as the element processor PE. This exchange switch EX is adapted to connect an element processor PE to a crossbar switch XB-X on the column, the particular element processor PE to a crossbar switch XB-Y on the row, and the crossbar switches XB-Y on these columns to the crossbar switch XB-Y on the row. As a result, the use of an exchange switch EX permits data transfer between given element processors PE. The data translation between element processors PE is effected by a message system. Specifically, a message is constructed in and sent out to the network from a data-transmitting element processor (transmitting PE), and received by a data-receiving element processor (receiving PE) thereby to effect data transfer.

Figure 26:
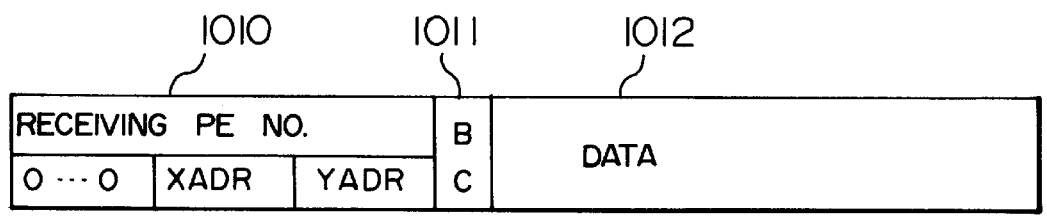
FIG. 26 shows the configuration of a message used in the parallel computer shown in FIG. 25.

An example of message construction is shown in FIG. 26. In FIG. 26, numeral 1010 designates a receiving element processor number (receiving PE number) field, numeral 1011 a broadcast control bit BC, and numeral 1012 a data field providing transfer information. The least significant three bits YADR of the receiving element processor number (receiving PE number) field 1010 represents information for switching the row crossbar switch XB-Y, and the next significant two bits XADR of the receiving element processor number (receiving PE number) field 1010 is information for switching the column crossbar switch XB-X. All the most significant digits of the receiving element processor number (receiving PE number) field 1010 are zero and are used for enlargement by increasing the number of element processors (PEs) in a parallel computer.

Figure 27:
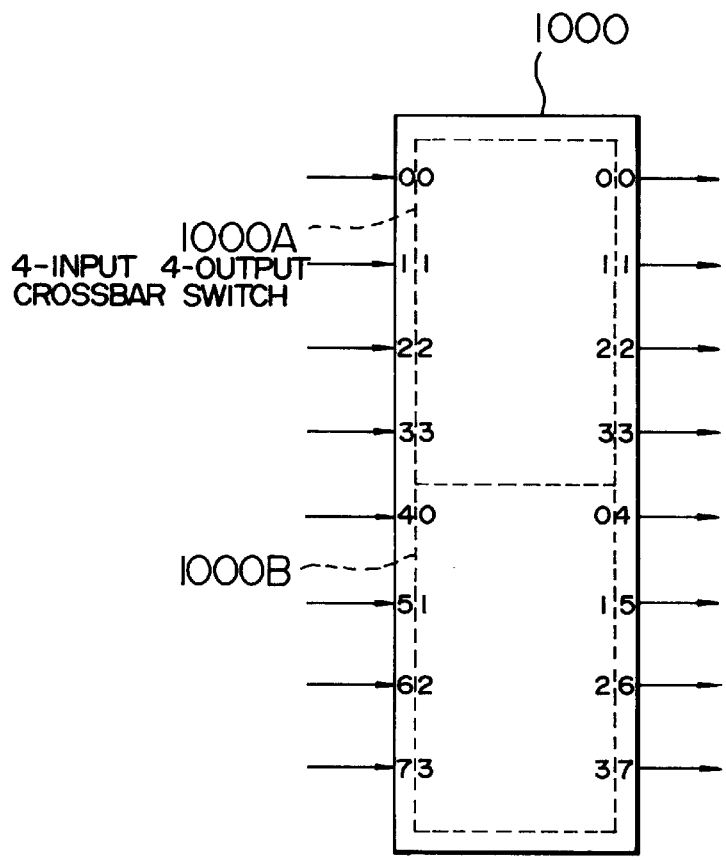
FIG. 27 shows the relationship between a split crossbar switch used in the parallel computer shown in FIG. 25 and a physical crossbar switch.

FIG. 27 shows two 4-input 4-output split crossbar switches 1000A, 1000B obtained by logically splitting an 8-input 8-output crossbar switch 1000 used in the present embodiment.

The physical input port numbers and the physical output port numbers of the 8-input 8-output crossbar switch 100, as shown to the extreme left and right in the diagram, are assumed to be 0 to 7. Among these crossbar switches, the input ports of physical input port numbers 0 to 3 and the output ports of physical output port numbers 0 to 3 are used as input and output ports respectively of the split crossbar switch 1000A. These input and output ports of the split crossbar switch 1000A, as shown in the diagram, are allotted with the logical input port numbers 0 to 3 and the logical output port numbers 0 to 3 respectively.

In similar fashion, the input ports of the physical input port numbers 4 to 7 and the output ports of the physical output numbers 4 to 7 are used as input ports and output ports of the split crossbar switch 1000B respectively. These input and output ports of the split crosssbar switch 1000B are also allotted with the logical input port numbers 0 to 3 and the logical output port numbers 0 to 3, respectively.

Figure 28:
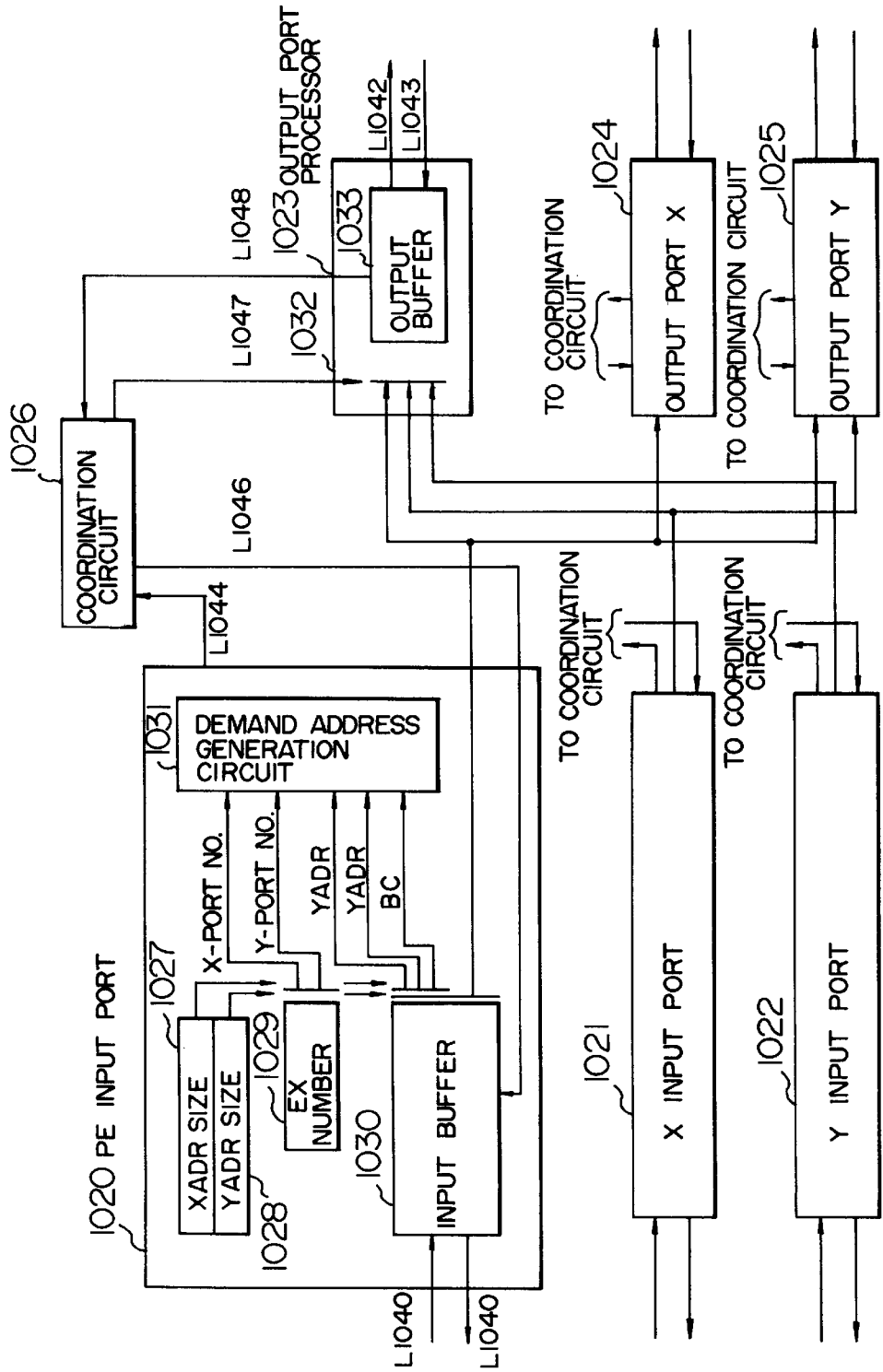
FIG. 28 is a diagram showing a detailed configuration of an exchange switch used in the parallel computer shown in FIG. 25.

FIG. 28 schematically shows a construction of the exchange switch EX. In FIG. 28, numerals 1020 to 1022 designate input ports of messages from the element processors PE connected to exchange switches respectively, the column crossbar switch XB-X and the row crossbar switch XB-Y, numerals 1023 to 1025 output ports of messages to the element processors PE, the related column crossbar switch XB-X and the related row crossbar switch XB-Y, numeral 1026 a coordination circuit, numeral 1027 a region for holding the size (number of bits) of the XADR field, numeral 1028 a region for holding the size (number of bits) of the YADR field, numeral 1029 a region for holding the exchange switch number, numeral 1030 an input buffer, numeral 1031 a demand address generation circuit, numeral 1032 a selector, and numeral 1033 an output buffer.

The input ports 1020 to 1022 are configured the same way for other than the demand address generation circuit 1031. The output ports 1023 to 1025 are also configured in the identical manner for other than the number of input ports connected to the selector 1032.

Now, the configuration of the input ports will be described with reference to the PE input port 1020. An import port holds the following network information in advance:

(1) Size (number of bits held) 1027 of the XADR field: Used at the time of cutting out the XADR portion from the EX number 1029 and the message (2) Size (number of bits held) 1028 of the YADR field: Used at the time of cutting out the YADR portion of the EX number 1029 and the message (3) Exchange switch number 1029: Providing the same number as the element processor PE connected thereto and used for comparing the address in the message These information are set in advance by an external circuit (such as a host computer (not shown) or a service processor (not shown)). As an alternative, they may be set by exchanging signals representing the condition information between the switches connected thereto.

By use of the XADR field size 1027 and the YADR field size 1028, the port number (X-port number) of the column crossbar switch XB-X connected to the exchange switch EX and the port number (Y-port number) of the row crossbar switch XB-Y are cut out from the exchange switch number 1029, and is sent into the demand address generation circuit 1031, thereby providing information for determining an address at the time of demand address generation.

The message sent into the PE input port 1020 through the line L1040 from the element processor PE connected to the exchange switch, on the other hand, is stored in the input buffer 1030. In the process, if the input buffer 1030 has no margin of space, an input buffer busy signal is sent to the particular element processor PE through the line L1041, thereby suppressing subsequent message transfer demands from the element processor PE.

The information on transfer destination is cut out from the message stored in the input buffer 1030.

The information on the transfer destination includes:
(1) XADR: A partial address for switching XB-X of the transfer destination element processor number (transfer destination PE number)
(2) YADR: A partial address for switching XB-Y of the transfer destination element processor number (transfer destination PE number)
(3) BC: A broadcast control bit These information are sent to the demand address generation circuit 1031 for determining the address at the time of generating a demand address. For cutting out XADR and YADR, by the way, as in the case of exchange switch EX number 1029, the XADR field size 1027 and the YADR field size 1028 are used.

The demand address generation circuit 1031 is for generating a message translation destination address (i.e., ID of the output port) demanded from the input port 1020 and sending the address to the coordination circuit 1026 through the line L1044.

A reply (accepting or rejecting the transmission) to the transmission demand from each input port is sent through the line L1046 from the coordination circuit 1026. Also, the selector 1032 in a corresponding output port is switched through the line L1047 at the same time.

The message of the selected input port is introduced to the output buffer 1033 of the demand address (output port ID) through the line L1045, and further through the line 1042, sent to the element processor PE connected therewith. The message is sent from another output port to XB-X or XB-Y.

In the case where the input buffer (not shown) of the row crossbar switch XB-Y, the column crossbar switch XB-X or the element processor PE connected to the exchange switch has no margin of space, then an input buffer busy signal is sent in through the line L1043. In accordance with this signal, the transmission processing is suppressed. In the case where the margin is depleted of the output buffer 1033 as a result of this effect, the fact is notified through the line L1047 to the coordination circuit 1026.

The relationship between the output information and the input information of the demand address generation circuit 1031 of the Y input port 1022, the x input port 1021 and the PE input port 1020 is shown in FIGS. 29A, 29B and 29C respectively. In the case under consideration, a configuration attaching priority to the column crossbar switch XB-X is assumed. More specifically, when XADR or YADR fails to coincide with the x port number or Y port number respectively in the PE port, i.e., when the transmission PE and the receiving PE fail to share the column crossbar switch XB-X or the row crossbar switch XB-Y, the message is sent out to the column crossbar switch XB-X. Also, in the broadcast processing, the data is sent from the transmission PE sequentially to the column crossbar switch XB-X, the row crossbar switch XB-Y and every PE in that order. Although priority is placed on the column crossbar switch XB-X in the case under consideration, the logics may be constructed alternatively with priority attached to the row crossbar switch XB-Y.

Figure 30:
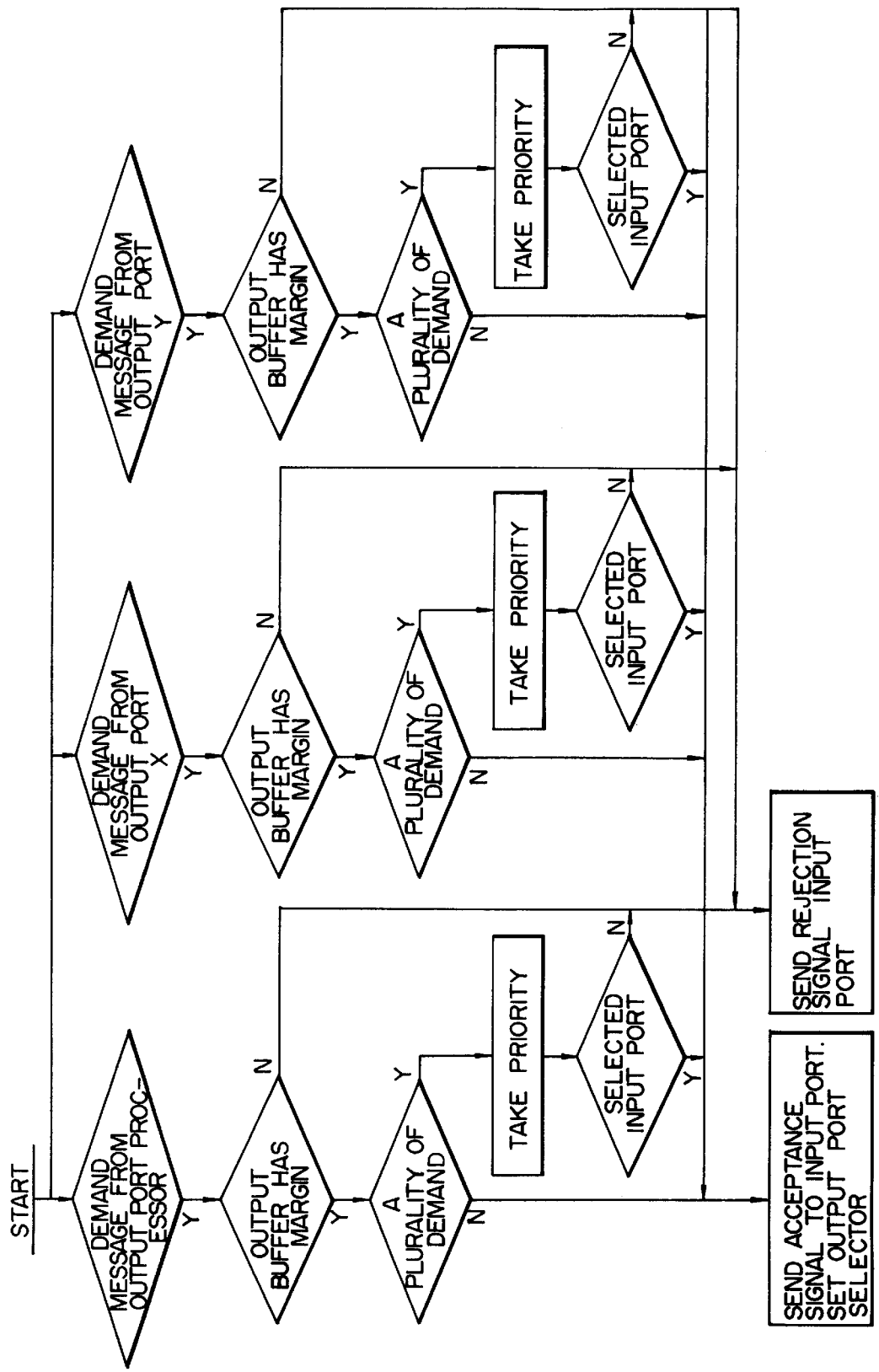
FIG. 30 is a flowchart of the operation of a coordination circuit in the exchange switch shown in FIG. 28.

The processing steps of the coordination circuit 1026 is shown in FIG. 30. In the case where a transfer demand is issued to each output port from a plurality of input ports at the same time, priority is placed in a manner to select one of the input ports. This priority is placed on the x input port, Y input port and the PE input port in that order in order not to increase the number of messages in the network on the one hand and to give priority to a message having many transfer steps on the other hand.

Figure 31:
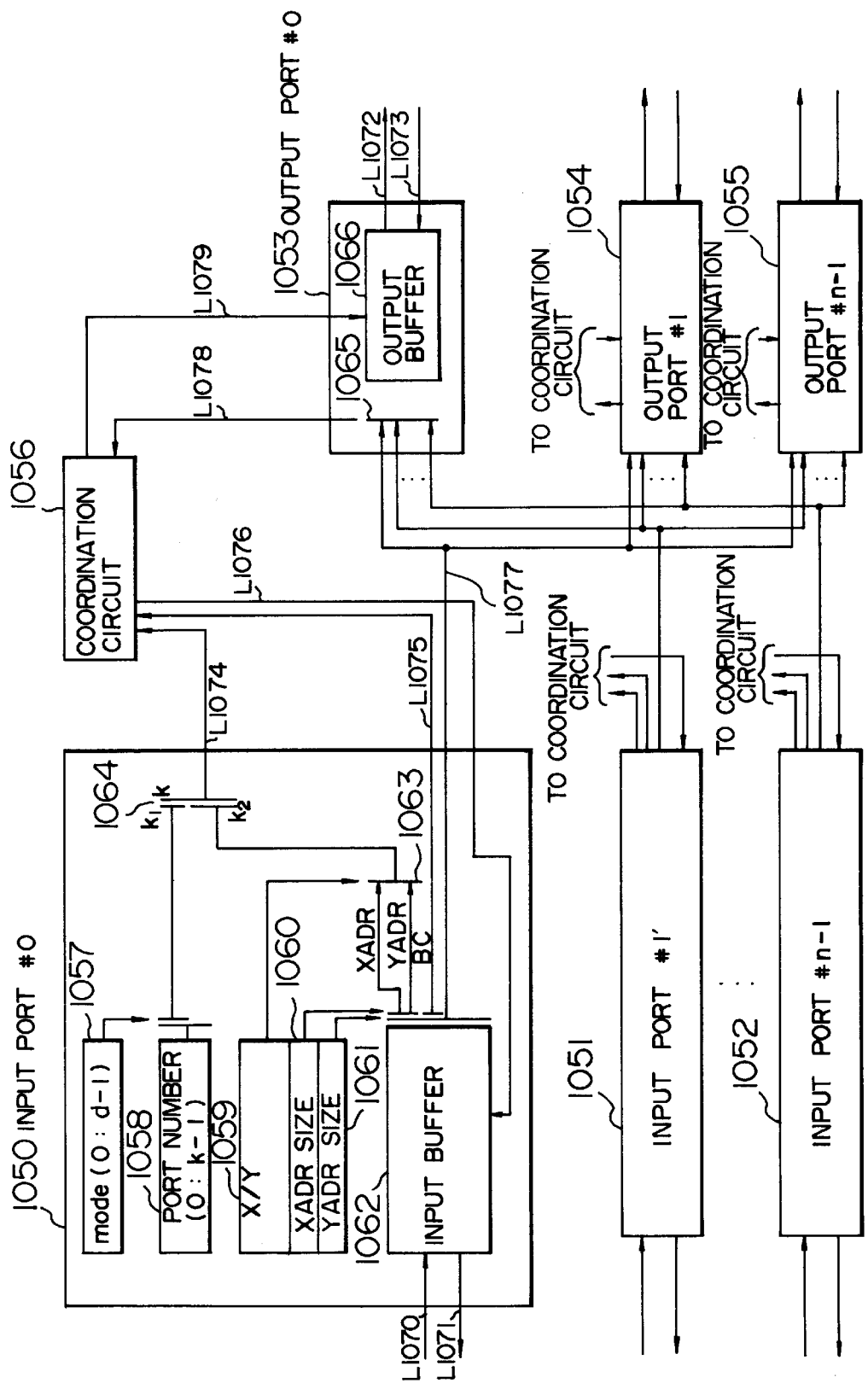
FIG. 31 is a detailed diagram showing a crossbar switch used in the parallel computer shown in FIG. 25.

Next, the configuration of a physical crossbar switch according to the present embodiment used for both the column crossbar switch XB-X and the row crossbar switch XB-Y is schematically shown in FIG. 31.

It is sufficient for the parallel computer shown in FIG. 25 to have an 8-input 8-output physical crossbar switch as described above. In the description that follows, however, a physical crossbar switch has a number n of inputs and also n outputs for the purpose of generalization. The character n is a positive integral number expressed as the k-th power of 2. In other words, k is a positive integral number given as $\log_2 n$.

In FIG. 31, numerals 1050 to 1052 designate input ports of a message from a plurality of exchange switches EX to be connected to the particular physical crossbar switch, numerals 1053 to 1055 output ports of a message to the exchange switches EX, numeral 1056 a coordination circuit, numeral 1057 a region for holding mode information (d bits) to determine the configuration of the particular physical crossbar switch, numeral 1058 a region for holding the input port number, numeral 10589 an x/Y type information, numeral 1060 a region for holding the XADR field size (number of bits), numeral 1061 a region for holding the YADR field size (number of bits), numeral 1062 an input buffer, numerals 10643 to 1065 selectors, and numeral 1066 an output buffer.

The input ports 1050 to 1052 are configured the same way as the output ports 1053 to 1055 are.

Now, explanation will be made about the configuration of the input ports with reference to the input port 1050 of the physical port number 0.

Each input port holds the following network information in advance:
(1) Mode information (d bits) 1057: Information on split use of crossbar switch
(2) Input port number 1058: Number information of input port
(3) x/Y type 1050: Information for identifying whether the split crossbar switch associated with the input port is the column crossbar switch XB-X or the row crossbar switch XB-Y.
(4) XADR field size (number of bits) 1060: Used at the time of cutting out the YADR portion from the EX number 1029 and the message
(5) YADR field size (number of bits) 1061: Used at the time of cutting out the YADR portion from the EX number 1029 and the message These information are set in advance from an external unit (such as a host computer (not shown) or a service processor (not shown)) or by exchanging signals representing each switch condition between switches connected thereto.

First, explanation will be made about a method of preparing mask information for converting a logical crossbar switch address in a message from the input port number 1058 and the mode information 1057 to an actual crossbar switch address.

In the mode information 1057, four types of modes of, say, 00, 01, 10, 11 are assumed to be set. They indicate that the crossbar switch is split into one, two, four and eight units respectively. In this case, the mode information 1057 becomes two bits (d=2). When the crossbar switch has a number n of inputs and also n outputs, the most significant $k_1$ bits of k bits (k=$\log_2 n$) in the input port number 1058 of a required address are masked. The number $k_1$ of bits to be masked varies as follows in accordance with the mode information 1057:

(1) When mode information is 00 (i.e., split into one), $k_1$=0 bit (2) When mode information is 01 (i.e., split into two), $k_1$=1 bit (3) When mode information is 10 (i.e., split into four), $k_1$=2 bits (4) When mode information is 11 (i.e., split into eight), $k_1$=3 bits The message sent into the input port 1050 through the line L1070 from a corresponding exchange switch EX, on the other hand, is stored in the input buffer 1062. In the process, if the input buffer 1062 has no margin of space, an input buffer busy signal is sent to the exchange switch EX of an input source through the line 1071, thereby suppressing subsequent demands for message transfer from EX.

The transfer destination information is cut out from the message thus stored in the input buffer 1062. This transfer destination information includes:

(1) XADR: A partial address for switching XB-X of the element processor number of a transfer destination (transfer destination PE number)

(2) YADR: A partial address for switching XB-Y of the element processor number of a transfer destination (transfer destination PE number)

(3) BC: Broadcast control bit

In order to cut out the XADR and YADR, the XADR field size 1060 and the YADR field size 1061 are used. Further, With the X/Y type information 1059 as address information required for the crossbar switch under consideration, either XADR or YADR is selected by the selector 1063.

Furthermore, the most significant bit $k_1$ of the address information is masked at 1064 with the mask information mentioned above, and is sent to the coordination circuit 1056 through the line L1074 as an actual output port address.

The broadcast control bit is sent directly to the coordination circuit 1056 through the line L1057.

A reply (permitting or rejecting the transmission) to a transmission demand from each input port is issued through the line L1076. At the same time, the selector 1065 in a corresponding output port is switched through the line L1078.

The message of a selected input port is introduced into the output buffer 1066 of the demanded output port number through the line L1077, and is sent through the line L1072 to the exchange switch EX connected thereto.

In the case where there is no margin of space in the input buffer (not shown) of the exchange switch EX connected thereto, an input buffer busy signal is received through the line L1073. In accordance with this signal, the transmission processing is suppressed. If the result is a lack of margin of space in the output buffer circuit 1066, the fact is notified through the line L1078 to the coordination circuit 1056.

Figure 32:
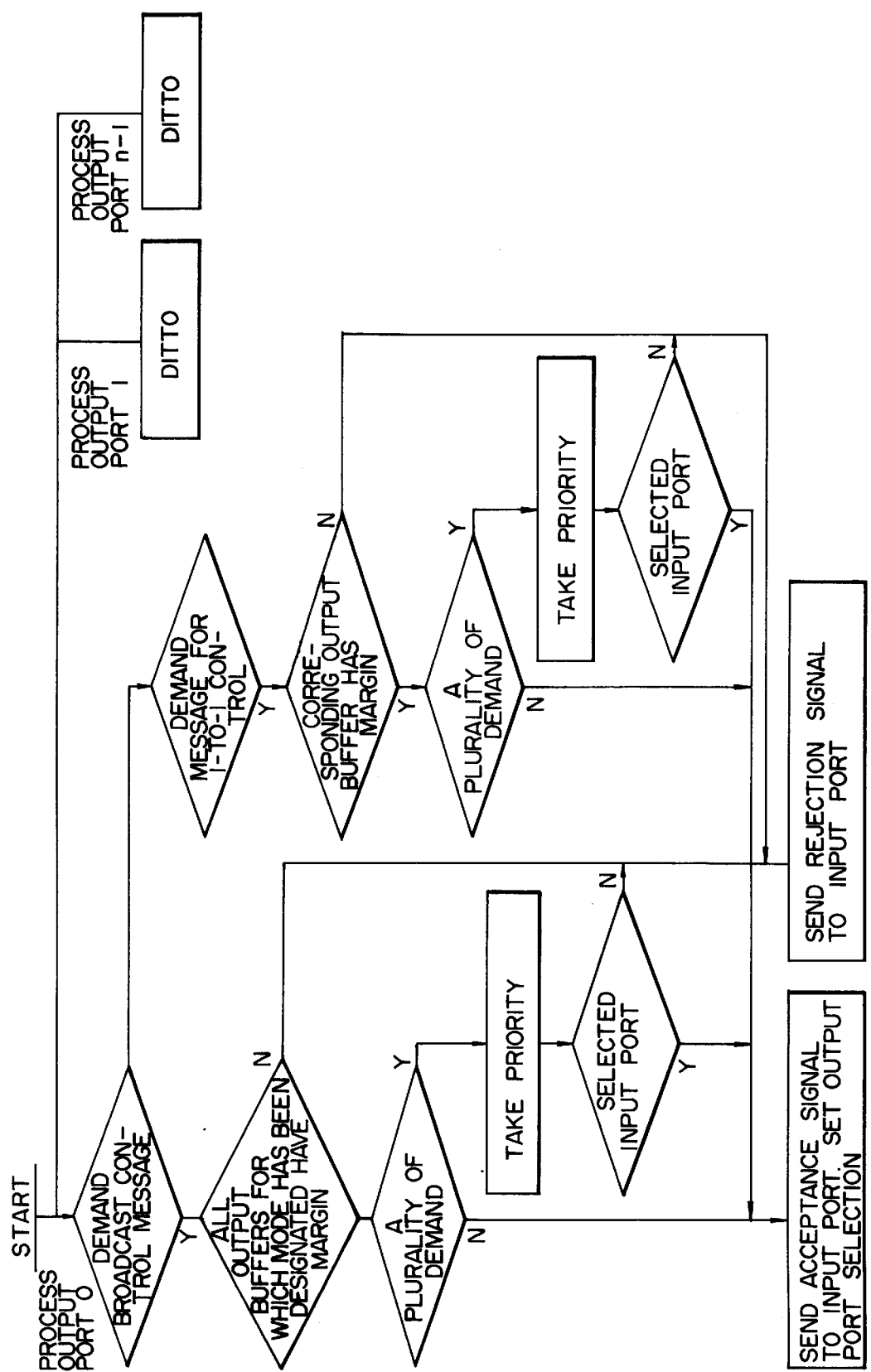
FIG. 32 is a flowchart of the operation of the coordination circuit in the crossbar switch shown in FIG. 31.

The order of processing in the coordination circuit 1056 is shown in FIG. 32. The operation of the coordination circuit 1056 is basically the same as that of the coordination circuit 1026 (FIG. 30) of the exchange switch EX, except that two pieces of information are added to the former: the broadcast control information BC sent from each input port and the crossbar switch mode information identical to that for each input port held inside. These two information makes broadcast processing possible even when a crossbar switch is split. In the broadcast processing, it is necessary to check that the output buffers in all the output ports requiring broadcast have a margin of space. Whether an output port requires broadcast can be determined in the same procedure as the mask processing for an input port described above by use of the mode information. The relationship between the range of outputs requiring translation of a broadcast message and the mode information is shown in FIG. 33.

As a result of the control of a crossbar switch as explained above, one of the following switches can be configured by the mode information from an n-input n-output crossbar switch:

(1) One n-input n-output crossbar switch in the case of mode information 00

(2) Two n/2-input n/2-output split crossbar switches in the case of mode information 01

(3) Four n/4-input n/4-output split crossbar switches in the case of mode information 10

(4) Eight n/8-input n/8-output split crossbar switches in the case of mode information 11

In applications of the techniques according to the present embodiment, the number of the element processors on the column or row is not limited. Further, the techniques of the present embodiment are applicable also to the n-dimensional hypercrossbar network with an m-dimensional (m: an integer of at least 3) grid structure.

What is claimed is:

1. A parallel computer, comprising:

(a) a plurality of processors; and (b) a network for connecting said processors for parallel transfer of messages therebetween, said network including a plurality of partial networks connected to each other so as to form said network, each partial network transfers messages, transferred to said each partial network, through said each partial network and in parallel to each other;

(c) each partial network comprises:

a plurality of input terminals for receiving a message from another one of said partial networks or one of said processors and a plurality of output terminals for providing a message to another one of said partial networks, a plurality of transfer control circuits, each transfer control circuit being provided in correspondence to and being connected to one of said output terminals and being further connected to said input terminals, a plurality of switches, each switch being connected to said input terminals and to one of said output terminals, each transfer control circuit including a plurality of partial transfer control circuits, each partial transfer control circuit being connected to a corresponding one of said input terminals and one of said output terminals corresponding to said each transfer control circuit;

each partial transfer control circuit included in each transfer control circuit responding to arrival of a partial broadcast message at said one input terminal connected to said each partial transfer control circuit and controlling whether said partial broadcast message is to be transmitted to said one output terminal corresponding to said each transfer control circuit, wherein said partial broadcast message is a message to be transmitted via said network from one of said processors to a processor group which includes part of said processors;

wherein each partial transfer control circuit within each transfer control circuit of each partial network comprises:

a first circuit for executing judgement to determine whether at least one processor belonging to said processor group is connected to a downstream one of said output terminals corresponding to said each transfer control circuit, and a second circuit responsive to an arrival of a partial broadcast message at one input terminal connected to said each partial transfer control circuit for generating, based upon a result of the judgement, a switch control signal to be supplied to one switch, of said plurality of switches provided in said each transfer control circuit which includes said each partial transfer control circuit;

wherein each partial network further comprises:

a third circuit for holding information related to locations in the network assigned to said part of said processors belonging to said processor group, wherein said first circuit included in each partial transfer control circuit within each transfer control circuit of each partial network includes a circuit for executing the judgement, depending upon said information held in said third circuit and upon a location in the network assigned to one output terminal provided in correspondence to said each transfer control circuit.

2. A parallel computer according to claim 1, wherein said each partial network further comprises:

wherein each switch of said plurality of switches is being included in a corresponding one of said transfer control circuits, and connected to said input terminals of said each partial network and to one output terminal, connected to one of said transfer control circuits which includes said each switch, among said output terminals of said each partial network;

wherein said each switch selects one of said input terminals included in said each partial network and connects the selected input terminal to one of said output terminals connected to said each switch;

wherein said each partial transfer control circuit included in said each transfer control circuit of said each partial network includes a signal generating circuit responsive to arrival of a partial broadcast message at one input terminal connected to said each partial transfer control circuit among said input terminals of said each partial network for providing one of said plurality of switches included in said each transfer control circuit with a switch control signal indicative of whether said one switch should select said one input terminal connected to said each partial transfer control circuit.

3. A parallel computer according to claim 2, wherein said each partial network further comprises:

a plurality of address decoders each being connected to a corresponding one of said input terminals within said each partial network; and a plurality of priority circuits, each provided in correspondence to and connected to one of said switches included in said each partial network and connected to one of said transfer control circuits of said each partial network, provided in correspondence to said one switch;

wherein each address decoder responds to a broadcast message supplied to one of said input terminals connected to said each address decoder, and supplies a plurality of switch control signals each for one of said switches, each switch control signal indicating that one of said switches to which said each switch control signal is supplied should select said one input terminal to which said broadcast message has been supplied;

wherein each address decoder further responds to a normal message supplied to one of said input terminals connected to said each address decoder, and supplies a switch control signal for one of said switches indicating that said one switch to which said switch control signal is supplied should select said one input terminal to which said normal message has been supplied;

wherein each priority circuit selects one of switch control signals each provided either from one of said address decoders or one of said partial transfer control circuits included in one of said transfer control circuits which includes one of said switches of said each partial network, connected to said each priority circuit, and provides the selected switch control signal to said one switch connected to said each priority circuit; and wherein said broadcast message is a message to be transmitted via said network from one of said processors to each of said processors, and said normal message is a message to be transmitted via said network from one of said processors to another one of said processors.

4. A parallel computer according to claim 1, wherein said information is related to a maximum value and a minimum value of said addresses assigned to said part of said processors.

5. A parallel computer according to claim 1, wherein an address assigned to each of said processors includes a plurality of address portions;

wherein each partial network is provided in correspondence to one of said address portions;

wherein said information held in said third circuit is one related to a range of values of the same address portions within addresses assigned to said part of said processors as an address portion corresponding to said each partial network.

6. A parallel computer according to claim 5, wherein each partial network comprises:

a crossbar switch.

7. A parallel computer according to claim 1, wherein said third circuit holds information related to addresses assigned to said part of said processors belonging to said processor group.

8. A parallel computer according to claim 1, wherein said first circuit included in each partial transfer control circuit within each transfer control circuit of each partial network, includes a circuit for executing the judgement, depending upon said information held in said third circuit and upon an address assigned to one output terminal provided in correspondence to said each transfer control circuit.

9. A network for transferring in parallel messages between a plurality of input terminals and a plurality of output terminals, comprising:

a plurality of input terminals for receiving a message from outside said network and a plurality of output terminals for providing a message outside said network;

a plurality of transfer control circuits, each transfer control circuit being provided in correspondence to and being connected to one of said output terminals and being further connected to said input terminals; and a plurality of switches, each switch being connected to said input terminals and to one of said output terminals, each transfer control circuit including a plurality of partial transfer control circuits, each partial transfer control circuit being connected to a corresponding one of said input terminals and one of said output terminals corresponding to said each transfer control circuit;

each partial transfer control circuit included in each transfer control circuit responding to arrival of a partial broadcast message at one input terminal connected to said each partial transfer control circuit and controlling whether said partial broadcast message is to be transmitted to said one output terminal connected to said each transfer control which includes said each partial transfer control circuit;

wherein said partial broadcast message is a message to be transmitted via said network from one of said input terminals to an output terminal group which includes part of said output terminals, wherein the network further comprises:

each switch of said plurality of switches is included in a corresponding one of said transfer control circuits, and each switch connected to said input terminals and to one output terminal connected to one of said transfer control circuits which includes said each switch, among said output terminals, wherein each switch selects one of said input terminals and connects the selected input terminal to one of said output terminals connected to said each switch, wherein each partial transfer control included in each transfer control circuit includes a signal generating circuit responsive to arrival of the partial broadcast message at one of the input terminals connected to said each partial transfer control circuit among said input terminals for providing one of said switches, included in said each transfer control circuit, with a switch control signal indicative of whether said one switch should select said one input terminal connected to said each partial transfer control;

wherein each partial transfer control within each transfer control circuit comprises:

a first circuit for executing judgement as to whether the output provided in correspondence to said each transfer control circuit belongs to said output terminal group, and a second circuit responsive to an arrival of a partial broadcast message at one of said input terminals connected to said each partial transfer control circuit for generating, based upon the result of the judgement, a switch control signal to be supplied to said switch provided in correspondence to said each transfer control circuit which includes said each partial transfer control circuit;

wherein said network further comprises:

a third circuit for holding information related to locations in the network assigned to said part of said output terminals belonging to said output terminal group, wherein said first circuit included in each partial transfer control circuit within each transfer control circuit includes a circuit for executing the judgement, depending upon said information held in said third circuit and upon a location in the network assigned to one of said output terminals provided in correspondence to said each transfer control circuit.

10. A network according to claim 9, wherein the network further comprises:

a plurality of address decoders each connected to a corresponding one of said input terminals; and a plurality of priority circuits each provided in correspondence to and being connected to one of said switches and being connected to one of said transfer control circuits provided in correspondence to said one switch;

wherein each address decoder responds to a broadcast message supplied to one of said input terminals connected to said each address decoder, and supplies a plurality of switch control signals each for one of said switches, each switch control signal indicating that one of said switches to which said each switch control signal is supplied should select said one input terminal to which said broadcast message has been supplied;

wherein each address decoder further responds to a normal message supplied to one of said input terminals connected to said each address decoder, and supplies a switch control signal for one of said switches indicating that one of said switches to which said switch control signal is supplied should select said one input terminal to which said normal message has been supplied;

wherein each priority circuit selects one of said switch control signals each provided either from one of said address decoders or one of said partial transfer controls included in said one of said transfer control circuits which includes one of said switches, connected to said each priority circuit, and provides the selected switch control signal to said one switch connected to said each priority circuits;

wherein said broadcast message is a message to be transmitted via said network from one of said input terminals to each of said output terminals, and said normal message is a message to be transmitted via said network from one of said input terminals to one of said plurality of output terminals.

11. A network according to claim 9, wherein said information is related to a maximum value and a minimum value of addresses assigned to said part of said output terminals.

12. A parallel computer including a plurality of processors and a network for connecting said processors, said network including a plurality of partial networks for transferring messages therebetween, said parallel computer comprises:

a plurality of both input and output terminals providing for each of said partial networks, for receiving and transmitting the messages between said partial networks;

circuits included in said partial network and provided for the corresponding input terminals respectively, for holding information indicating said output terminals to which a partial broadcast message received at said input terminal is transferred;

a judgement circuit provided in said partial network, for determining said output terminals to which the partial broadcast message received at said input terminal is transferred in response to the information; and a switch circuit for switching a broadcast message received at said input terminal to said output terminals, and for switching the partial broadcast message received at said input terminal to said output terminal in accordance with a result from said judgement circuit in order to output the partial broadcast message received at said input terminal from said output terminals determined by said judgement circuit.

13. A parallel computer according to claim 12, wherein said circuits hold information for indicating a plurality of output ports.

14. A parallel computer according to claim 12, wherein a combination of the information held in said circuits in a plurality of the partial networks determines a transfer destination of a partial broadcast message.

15. A network for transferring messages among a plurality of processors, said network comprising:

a plurality of partial networks forming said network;

a plurality of both input and output terminals providing for each of said partial networks, for receiving and transmitting the messages between said partial networks;

circuits included in said partial network and provided for the corresponding input terminals respectively, for holding information indicating said output terminals to which a partial broadcast message transmitted by said processor and inputted to said input terminals is transferred;

a judgement circuit provided in said partial network, for determining said output terminals to which the partial broadcast message inputted to said input terminal is transferred in response to the information; and a switch circuit for switching a broadcast message received at said input terminal to said output terminals, and for switching the partial broadcast message received at said input terminal to said output terminal in accordance with a result from said judgement circuit in order to output the partial broadcast message received at said input terminal from said output terminals determined by said judgement circuit.

16. A network according to claim 15, wherein the information held in said circuits indicates a transfer destination of an output port of a partial broadcast message.

17. A network according to claim 15, wherein a combination of the information held in said circuits in a plurality of the partial networks determines a transfer destination of a partial broadcast message.

* * * * *